(12) United States Patent
Darshini et al.

(10) Patent No.: US 12,149,939 B2
(45) Date of Patent: Nov. 19, 2024

(54) COMMUNICATION SYSTEM

(71) Applicant: NEC Corporation, Tokyo (JP)

(72) Inventors: Priya Darshini, Surrey (GB); Chadi Khirallah, Surrey (GB); Sadafuku Hayashi, Tokyo (JP); Jagdeep Ahluwalia Singh, Surrey (GB); Neeraj Gupta, Surrey (GB)

(73) Assignee: NEC CORPORATION, Tokyo (JP)

(*) Notice: Subject to any disclaimer, the term of this patent is extended or adjusted under 35 U.S.C. 154(b) by 504 days.

(21) Appl. No.: 17/442,841

(22) PCT Filed: Mar. 24, 2020

(86) PCT No.: PCT/JP2020/012918
§ 371 (c)(1),
(2) Date: Sep. 24, 2021

(87) PCT Pub. No.: WO2020/203446
PCT Pub. Date: Oct. 8, 2020

(65) Prior Publication Data
US 2022/0353687 A1  Nov. 3, 2022

(30) Foreign Application Priority Data

Apr. 5, 2019 (GB) .................................... 1904883

(51) Int. Cl.
*H04W 12/106* (2021.01)
*H04L 5/00* (2006.01)
*H04W 72/21* (2023.01)
*H04W 76/14* (2018.01)

(52) U.S. Cl.
CPC ......... *H04W 12/106* (2021.01); *H04L 5/0071* (2013.01); *H04W 72/21* (2023.01); *H04W 76/14* (2018.02)

(58) Field of Classification Search
CPC ... H04W 12/106; H04W 76/14; H04W 72/21; H04L 5/0071
See application file for complete search history.

(56) References Cited

U.S. PATENT DOCUMENTS

| 11,800,408 | B2* | 10/2023 | Schliwa-Bertling .... H04L 47/83 |
| 2009/0097444 | A1 | 4/2009 | Lohr et al. |
| 2020/0092753 | A1 | 3/2020 | Liu et al. |
| 2021/0084130 | A1* | 3/2021 | Dai ......................... G06F 21/64 |

(Continued)

FOREIGN PATENT DOCUMENTS

| JP | 2008-283321 A | 11/2008 |
| JP | 2009-529263 A | 8/2009 |
| WO | 2018/228470 A1 | 12/2018 |

OTHER PUBLICATIONS

Zte, Solution for UL AMBR for CU-DU, Jul. 10, 2018, 3GPP, p. 1-2 (Year: 2018).*

(Continued)

*Primary Examiner* — Stephen T Gundry
(74) *Attorney, Agent, or Firm* — Sughrue Mion, PLLC

(57) ABSTRACT

A communication system is disclosed in which a base station apparatus obtains information identifying a total integrity protected uplink data rate for a user equipment (UE), allocates a portion of the total integrity protected uplink data rate to a secondary node (SN), and notifies the UE about the portion allocated to the SN.

6 Claims, 12 Drawing Sheets

(56) References Cited

U.S. PATENT DOCUMENTS

| | | | |
|---|---|---|---|
| 2021/0297909 A1* | 9/2021 | Lee | H04W 36/00837 |
| 2021/0306848 A1* | 9/2021 | Chen | H04W 76/18 |
| 2021/0321426 A1* | 10/2021 | Lee | H04W 72/21 |
| 2021/0337424 A1* | 10/2021 | Basu Mallick | H04W 72/21 |
| 2021/0352082 A1* | 11/2021 | Lou | H04W 12/102 |
| 2021/0360730 A1* | 11/2021 | Kim | H04W 74/0833 |
| 2021/0385846 A1* | 12/2021 | Lee | H04W 28/0278 |
| 2022/0116843 A1* | 4/2022 | Velev | H04W 4/50 |
| 2022/0132316 A1* | 4/2022 | De Kievit | H04W 12/033 |
| 2022/0132375 A1* | 4/2022 | Khirallah | H04W 12/106 |
| 2022/0132455 A1* | 4/2022 | Gupta | H04W 60/00 |
| 2022/0141748 A1* | 5/2022 | Lee | H04W 12/04 370/331 |
| 2022/0150973 A1* | 5/2022 | Lim | H04W 72/1268 |
| 2022/0151014 A1* | 5/2022 | Kedalagudde | H04W 76/19 |
| 2022/0159465 A1* | 5/2022 | Shrestha | H04W 12/0431 |
| 2022/0159706 A1* | 5/2022 | Panteleev | H04L 1/08 |
| 2022/0166550 A1* | 5/2022 | Ye | H04W 52/38 |
| 2022/0174482 A1* | 6/2022 | Wifvesson | H04W 12/37 |
| 2022/0183086 A1* | 6/2022 | Müller | H04W 72/12 |
| 2022/0201553 A1* | 6/2022 | Keller | H04W 76/10 |
| 2022/0256532 A1* | 8/2022 | Lee | H04W 72/56 |
| 2022/0256645 A1* | 8/2022 | Yi | H04W 80/02 |
| 2022/0338084 A1* | 10/2022 | Ryu | H04W 36/0011 |
| 2023/0041912 A1* | 2/2023 | Talebi Fard | H04W 36/08 |
| 2023/0041940 A1* | 2/2023 | Park | H04W 24/04 |
| 2023/0112860 A1* | 4/2023 | Gan | H04L 67/14 370/329 |
| 2023/0164861 A1* | 5/2023 | Wang | H04W 76/15 370/328 |
| 2023/0164869 A1* | 5/2023 | Lee | H04W 76/15 455/450 |
| 2023/0362723 A1* | 11/2023 | Qiao | H04W 28/06 |
| 2023/0370845 A1* | 11/2023 | Jo | H04W 8/04 |
| 2023/0403346 A1* | 12/2023 | Dai | H04L 69/327 |

OTHER PUBLICATIONS

International Search Report for PCT Application No. PCT/JP2020/012918, mailed on Jul. 24, 2020.

English translation of Written opinion for PCT Application No. PCT/JP2020/012918, mailed on Jul. 24, 2020.

Next Generation Mobile Networks (NGMN) Alliance, "NGMN 5G White Paper", NGMN 5G White Paper V1.0, Feb. 17, 2015, pp. 1-125.

3rd Generation Partnership Project, "Technical Specification Group Radio Access Network; NR; NR and NG-RAN Overall Description; Stage 2 (Release 15)", 3GPP TS 38.300 V15.4.0, Dec. 2018, pp. 1-97.

3rd Generation Partnership Project, "Technical Specification Group Radio Access Network; Evolved Universal Terrestrial Radio Access (E-UTRA) and NR; Multi-connectivity; Stage 2 (Release 15)", 3GPP TS 37.340 V15.4.0, Dec. 2018, pp. 1-67.

3rd Generation Partnership Project, "Technical Specification Group Radio Access Network; NG-RAN; Architecture description (Release 15)", 3GPP TS 38.401 V15.4.0, Dec. 2018, pp. 1-40.

3rd Generation Partnership Project, "Technical Specification Group Radio Access Network; NG-RAN; E1 general aspects and principles (Release 15)", 3GPP TS 38.460 V15.2.0, Dec. 2018, pp. 1-10,.

3rd Generation Partnership Project, "Technical Specification Group Services and System Aspects; System Architecture for the 5G System; Stage 2 (Release 15)", 3GPP TS 23.501 V15.4.0, Dec. 2018, pp. 1-236.

3rd Generation Partnership Project, "Technical Specification Group Radio Access Network; NR; Medium Access Control (MAC) protocol specification (Release 15)", 3GPP TS 38.321 V15.4.0, Dec. 2018, pp. 1-77.

3rd Generation Partnership Project, "Technical Specification Group Radio Access Network; NG-RAN; F1 general aspects and principles (Release 15)", 3GPP TS 38.470 V15.4.0, Dec. 2018, pp. 1-13.

3rd Generation Partnership Project, "Technical Specification Group Radio Access Network; Evolved Universal Terrestrial Radio Access (E-UTRA) and Evolved Universal Terrestrial Radio Access Network (E-UTRAN); Overall description; Stage 2 (Release 15)", 3GPP TS 36.300 V15.4.0, Dec. 2018, pp. 1-363.

3rd Generation Partnership Project, "Technical Specification Group Radio Access Network; Evolved Universal Terrestrial Radio Access Network (E-UTRAN); S1 Application Protocol (S1AP) (Release 15)", 3GPP TS 36.413 V15.4.0, Dec. 2018, pp. 1-383.

3rd Generation Partnership Project, "Technical Specification Group Radio Access Network; Evolved Universal Terrestrial Radio Access Network (E-UTRAN); X2 application protocol (X2AP) (Release 15)", 3GPP TS 36.423 V15.4.0, Dec. 2018, pp. 1-408.

3rd Generation Partnership Project, "Technical Specification Group Radio Access Network; NR; Radio Resource Control (RRC) protocol specification (Release 15)", 3GPP TS 38.331 V15.4.0, Dec. 2018, pp. 1-474.

Qualcomm, "Support of maximum bit rate for Integrity Protection", 3GPP R3-184711, 3GPP TSG-RAN WG3 Meeting #101, Gothenburg, Sweden, Aug. 20-24, 2018.

ZTE, "Solution for UL AMBR for CU-DU", 3GPP R3-184285, 3GPP TSG-RAN WG3 NR AdHoc 1807, Montreal, Canada, Jul. 2-6, 2018.

Huawei, "Maximum Bit Rate for Integrity Protection", 3GPP R3-186947, 3GPP TSG-RAN3 Meeting #102, Spokane, US, Nov. 12-16, 2018.

Qualcomm, "Summary of offline discussion on enforcement of UE's maximum bit rate for Integrity Protection", 3GPP R3-186152, 3GPP TSG-RAN WG3 Meeting #101bis, Chengdu, China, Oct. 8-12, 2018.

Japanese Office Action for JP Application No. 2021-559190, mailed on Oct. 25, 2022 with English Translation.

3GPP TSG RAN WG3 adhoc_R3-AH-1807, R3-184088, Ericsson, "Latest findings on UL AMBR". Montreal, Canada, Jul. 2-6, 2018.

3GPP TSG RAN WG3 #97, R3-173106, Huawei, "UE context management on F1", Berlin, Germany, Aug. 21-25, 2017.

JP Office Action for Japanese Patent Application No. 2023-068400, mailed on Jun. 11, 2024 with English Translation.

Ericsson, "Way Forward on UL AMBR Monitoring and enforcement", 3GPP TSG RAN WG3 #99bis R3-182290, Internet<URL:https://www.3gpp.org/ftp/tsg_ran/WG3_Iu/TSGR3_99bis/Docs/R3-182290.zip>, Apr. 7, 2018.

* cited by examiner

| LCID | UL/DL | Bit Rate | Oct 1 |
|---|---|---|---|
| Bit Rate | R | R | Oct 2 |

Recommended bit rate MAC CE

Figure 10

F1AP: UE Context Setup Procedure

COMMUNICATION SYSTEM

This application is a National Stage Entry of PCT/JP2020/012918 filed on Mar. 24, 2020, which claims priority from Great Britain Patent Application 1904883.4 filed on Apr. 5, 2019, the contents of all of which are incorporated herein by reference, in their entirety.

TECHNICAL FIELD

The present invention relates to a wireless communication system and devices thereof operating according to the 3rd Generation Partnership Project (3GPP) standards or equivalents or derivatives thereof. The disclosure has particular but not exclusive relevance to improvements relating to enforcement of integrity protected data rate for user equipment in the so-called '5G' (or 'Next Generation') systems.

BACKGROUND ART

The latest developments of the 3GPP standards are the so-called '5G' or 'New Radio' (NR) standards which refer to an evolving communication technology that is expected to support a variety of applications and services such as Machine Type Communications (MTC), Internet of Things (IoT) communications, vehicular communications and autonomous cars, high resolution video streaming, smart city services, and/or the like. 5G technologies enable network access to virtual markets and support network (RAN) sharing for offering networking services to third parties and for creating new business opportunities. 3GPP intends to support 5G by way of the so-called 3GPP Next Generation (NextGen) radio access network (RAN) and the 3GPP NextGen core (NGC) network. Various details of 5G networks are described in, for example, the 'NGMN 5G White Paper' V 1.0 by the Next Generation Mobile Networks (NGMN) Alliance.

End-user communication devices are commonly referred to as User Equipment (UE) which may be operated by a human or comprise automated (MTC/IoT) devices. Whilst a base station of a 5G/NR communication system is commonly referred to as a New Radio Base Station ('NR-BS') or as a 'gNB' it will be appreciated that they may be referred to using the term 'eNB' (or 5G/NR eNB) which is more typically associated with Long Term Evolution (LTE) base stations (also commonly referred to as '4G' base stations). 3GPP Technical Specification (TS) 38.300 V 15.4.0 and TS 37.340 V 15.4.0 define the following nodes, amongst others:

gNB: node providing NR user plane and control plane protocol terminations towards the UE, and connected via the NG interface to the 5G core network (5GC).

ng-eNB: node providing Evolved Universal Terrestrial Radio Access (E-UTRA) user plane and control plane protocol terminations towards the UE, and connected via the NG interface to the 5GC.

En-gNB: node providing NR user plane and control plane protocol terminations towards the UE, and acting as Secondary Node in E-UTRA-NR Dual Connectivity (EN-DC).

NG-RAN node: either a gNB or an ng-eNB.

3GPP also defined the so-called 'Xn' interface as the network interface between neighbouring NG-RAN nodes.

Recently, it has also been proposed that the functionality of a gNB (referred to herein as a 'distributed' gNB) may be split between one or more distributed units (DUs) and a central unit (CU) with a CU typically performing higher level functions and communication with the next generation core and with the DU performing lower level functions and communication over an air interface with user equipment (UE) in the vicinity (i.e. in a cell operated by the gNB). Specifically, 3GPP TS 38.401 V 15.4.0 specifies the following functional units:

gNB Central Unit (gNB-CU): a logical node hosting Radio Resource Control (RRC), Service Data Adaptation Protocol (SDAP) and Packet Data Convergence Protocol (PDCP) layers of the gNB or RRC and PDCP layers of the En-gNB that controls the operation of one or more gNB-DUs. The gNB-CU terminates the F1 interface connected with the gNB-DU.

gNB Distributed Unit (gNB-DU): a logical node hosting Radio Link Control (RLC), Medium Access Control (MAC) and Physical (PHY) layers of the gNB or En-gNB, and its operation is partly controlled by gNB-CU. One gNB-DU supports one or multiple cells. One cell is supported by only one gNB-DU. The gNB-DU terminates the F1 interface connected with the gNB-CU.

gNB-CU-Control Plane (gNB-CU-CP): a logical node hosting the RRC and the control plane part of the PDCP protocol of the gNB-CU for an En-gNB or a gNB. The gNB-CU-CP terminates the E1 interface connected with the gNB-CU-UP and the F1-C interface connected with the gNB-DU.

gNB-CU-User Plane (gNB-CU-UP): a logical node hosting the user plane part of the PDCP protocol of the gNB-CU for an En-gNB, and the user plane part of the PDCP protocol and the SDAP protocol of the gNB-CU for a gNB. The gNB-CU-UP terminates the E1 interface connected with the gNB-CU-CP and the F1-U interface connected with the gNB-DU.

In accordance with 3GPP TS 38.401, the overall architecture for separation of gNB-CU-CP and gNB-CU-UP is based on the following principles:

a gNB may consist of a gNB-CU-CP, multiple gNB-CU-UPs and multiple gNB-DUs;

one gNB-DU is connected to only one gNB-CU-CP;

one gN-CU-UP is connected to only one gNB-CU-CP;

one gNB-DU can be connected to multiple gNB-CU-UPs under the control of the same gNB-CU-CP; and one gN-CU-UP can be connected to multiple DUs under the control of the same gNB-CU-CP.

However, it will be appreciated that for resiliency a gNB-DU and/or a gNB-CU-UP may be connected to multiple gNB-CU-CPs. The connectivity between a gNB-CU-UP and a gNB-DU is established by the gNB-CU-CP using Bearer Context Management functions. The gNB-CU-CP selects the appropriate gNB-CU-UP(s) for the requested services for the UE. When multiple CU-UPs are used, the CU-UPs belong to same security domain as defined in TS 33.210 V 15.2.0.

The general aspects and principles relating to the E1 interface (between the gNB-CU-CP and the gNB-CU-UP) are described in 3GPP TS 38.460 V 15.2.0. The E1 interface supports various interface management relevant procedures, such as setup, configuration update, reset, release, error indication, and/or the like.

3GPP TS 23.501 V 15.4.0 describes that when a UE is involved in a Protocol Data Unit (PDU) session with User Plane (UP) security, an appropriate data rate may need to be enforced for that PDU session. Specifically, the NG-RAN applies User Plane security policies for a PDU session based on the relevant User Plane Security Enforcement information.

The User Plane Security Enforcement information indicates whether UP integrity protection is:
  Required (for all the traffic on the PDU Session UP integrity protection shall apply);
  Preferred (for all the traffic on the PDU Session UP integrity protection should apply, although this is not a mandatory requirement); or
  Not Needed (UP integrity protection shall not apply on the PDU Session).

The User Plane Security Enforcement information also indicates whether UP confidentiality protection is:
  Required (for all the traffic on the PDU Session UP confidentiality protection shall apply);
  Preferred (for all the traffic on the PDU Session UP confidentiality protection should apply, although this is not a mandatory requirement); or
  Not Needed (UP confidentiality shall not apply on the PDU Session).

User Plane Security Enforcement information applies only over 3GPP access. Once determined at the establishment of the PDU Session the User Plane Security Enforcement information applies for the life time of the PDU Session.

The so-called Session Management Function (SMF) determines at PDU session establishment a User Plane Security Enforcement information for the user plane of a PDU session based on (one or more of) the following:
  subscribed User Plane Security Policy which is part of SM subscription information received from Unified Data Management (UDM);
  locally configured User Plane Security Policy (per Data Network Name (DNN)/Single Network Slice Selection Assistance Information (S-NSSAI)) in the SMF (e.g. when the UDM does not provide User Plane Security Policy information); and
  the maximum supported data rate per UE for integrity protection for the Data Radio Bearers (DRBs), indicated by the UE during the PDU Session Establishment.

3GPP agreed to limit the maximum data rate per UE for integrity protection of DRBs (at least for Rel-15). 3GPP TS 38.300, section 13.1 states that the maximum supported data rate for integrity protected DRBs is a UE capability indicated at Non-Access Stratum (NAS) layer, with a minimum value of 64 kbps and a maximum value of the highest data rate supported by the UE.

The User Plane Security Enforcement information is communicated from SMF to the NG-RAN for enforcement as part of PDU session related information. If the UP Integrity Protection is determined to be "Required" or "Preferred", the SMF also provides the maximum supported data rate per UE for integrity protection as received in the '5GSM capability' information element (IE). This takes place at establishment of a PDU Session or at activation of the user plane of a PDU Session. The NG-RAN rejects the establishment of UP resources for the PDU Session when it cannot fulfil User Plane Security Enforcement information with a value of Required. The NG-RAN may also take the maximum supported data rate per UE for integrity protection into account in its decision on whether to accept or reject the establishment of UP resources. In this case the SMF releases the PDU Session. The NG-RAN notifies the SMF when it cannot fulfil a User Plane Security Enforcement with a value of Preferred. For example, the NG-RAN cannot fulfil requirements in User Plane Security Enforcement information with UP integrity protection set to "Required" when it cannot negotiate an appropriate UP integrity protection with the UE.

The User Plane Security Enforcement information and the maximum supported data rate per UE for integrity protection are communicated from source to target NG-RAN node at handover. If the target RAN node cannot support requirements in User Plane Security Enforcement information, the target RAN node rejects the request to setup resources for the PDU Session. In this case the PDU Session is not handed over to the target RAN node and the PDU Session is released.

When the UE is served by more than one base station, each serving base station handles at least a part of the UE's User Plane communications. For example, the UE may be served by a gNB configured as a Master Node (MN) and also served by another gNB configured as a Secondary Node (SN). Similarly, the UE may be served by multiple units of a distributed gNB. Thus, in order to perform data rate enforcement when the UE's PDU session involves more than one base station, a "portion" of the UE maximum integrity protected data rate is enforced by each serving base station. Specifically, when the UE is served by an MN and an SN, the MN signals a "portion" of the (total) UE maximum IP data rate for enforcement by the receiving SN. The applicable portion is included in the Maximum Integrity Protected Data Rate IE sent to the SN. It will be appreciated that the "Portion" is a hard limit that is sent from MN to SN (inter-node), or from SN-CU-CP to SN-CU-UP (intra-node).

The UE's data rate capability for integrity protected DRBs is signalled to the gNB (over the NG interface) independently for uplink and downlink (i.e. as a maximum 'UL DRB-IP data rate' capability and a maximum 'DL DRB-IP data rate' capability, respectively). Specifically, for each PDU session the so-called 'Maximum Integrity Protected Data Rate Uplink' IE and the 'Maximum Integrity Protected Data Rate Downlink' IE are included in the 'Security Indication' IE in the 'PDU Session Resource Setup Request Transfer' IE of the 'PDU SESSION RESOURCE SETUP REQUEST' message that initiates setting up resources for a PDU session for the given UE. When an SN is involved, the uplink and downlink data rate capabilities of the UE for integrity protected DRBs are signalled by the MN to the SN over the Xn interface (e.g. at SN addition and modification).

The gNB may also signal a recommended Bit Rate to the UE, as specified in section 5.18.10 of 3GPP TS 38.321 V 15.4.0. The recommended bit rate procedure is used to provide the MAC entity with information about the bit rate which the gNB recommends. The gNB may transmit the 'Recommended bit rate' MAC control element (CE) to the MAC entity to indicate the recommended bit rate for the UE for a specific logical channel and a specific direction (either uplink or downlink).

SUMMARY OF INVENTION

However, the inventors have identified a number of problems relating to data rate enforcement for the uplink when the UE's PDU session involves more than one base station.

Specifically, although it has been agreed that the portion of UE UL Maximum Integrity Protected Data Rate is sent from the MN to SN for admission control, it is not yet known how the SN is expected to use the portion to allow enforcement of UE UL Maximum Integrity Protected Data Rate at the UE (once a PDU session has been admitted).

This may cause problems in correctly enforcing the UE UL Maximum Integrity Protected Data Rate for the UE's PDU sessions handled by the SN (the UE's DRBs terminated at the SN). For example, in case of dual connectivity, the UE UL Maximum Integrity Protected Data Rate is not used by the SN (since this is not currently specified by 3GPP). As a result, the UE UL Maximum Integrity Protected Data Rate will not be taken into account by the MAC entity (in the gNB-DU/SN) in assignment of UL scheduling grants for the UE. Thus, the network may assign a grant for UL traffic that is not suitable for the UE's Maximum IP Data Rate (e.g. the assigned grant may result in an UL rate that exceeds the UE max IP rate).

Whilst the UE knows its own total UE UL Maximum Integrity Protected Data Rate, it does not know the MN and the SN portions of the UE UL Maximum Integrity Protected Data Rate. Hence, the UE will not be able to enforce the UE UL Integrity Protected data rate on its MN-terminated and SN-terminated bearers.

Moreover, during data transfer phase, if the data rate changes, the UE can re-distribute the portions among MN and SN bearers, which may cause further issues at the gNB because the gNB is not aware of this rate change (i.e. the new MN and SN portions).

Accordingly, the present invention seeks to provide methods and associated apparatus that address or at least alleviate (at least some of) the above described problems.

In one exemplary aspect, the invention provides a method performed by a base station apparatus comprising a central unit (CU), and one or more distributed units (DUs) for handling user-plane transmissions for a user equipment (UE), the method comprising: obtaining, for a Data Radio Bearer (DRB), an integrity protected data rate for a Protocol Data Unit (PDU) session associated with the UE; and sending information identifying said integrity protected data rate, from the CU to at least one DU, when setting up or modifying a user context associated with the UE.

In one exemplary aspect, the invention provides a method performed by a distributed unit (DU) of a distributed base station apparatus handling user-plane transmissions for a user equipment (UE), the method comprising: receiving, from a central unit (CU) when setting up or modifying a user context associated with the UE, information identifying an integrity protected data rate, for a Data Radio Bearer (DRB), for a Protocol Data Unit (PDU) session associated with the UE.

In one exemplary aspect, the invention provides a method performed by a base station apparatus, the method comprising: obtaining information identifying a total integrity protected uplink data rate for a user equipment (UE); allocating a portion of the total integrity protected uplink data rate to a secondary node (SN); and notifying the UE about said portion allocated to the SN.

In one exemplary aspect, the invention provides a method performed by a user equipment (UE), the method comprising: receiving, from a base station apparatus, information identifying a portion, allocated to a secondary node (SN), of a total integrity protected uplink data rate for the UE.

In one exemplary aspect, the invention provides a method performed by a user equipment (UE), the method comprising: transmitting integrity protected data on a Data Radio Bearer (DRB); determining, based on a maximum integrity protected uplink data rate for the UE, a recommended maximum bit rate for integrity protected uplink transmissions for the DRB; and sending, to a base station apparatus, a Medium Access Control (MAC) control element (CE) comprising information identifying said recommended maximum bit rate for integrity protected uplink transmissions for the DRB.

In one exemplary aspect, the invention provides a base station apparatus comprising a central unit (CU), one or more distributed units (DUs) for handling user-plane transmissions for a user equipment (UE), at least one controller and at least one transceiver, the at least one controller being configured to: obtain, for a Data Radio Bearer (DRB), an integrity protected data rate for a Protocol Data Unit (PDU) session associated with the UE; and send information identifying said integrity protected data rate, from the CU to at least one DU, when setting up or modifying a user context associated with the UE.

In one exemplary aspect, the invention provides a distributed unit (DU) of a distributed base station apparatus handling user-plane transmissions for a user equipment (UE), the DU comprising a controller and a transceiver, the controller being configured to: receive, from a central unit (CU) when setting up or modifying a user context associated with the UE, information identifying an integrity protected data rate, for a Data Radio Bearer (DRB), for a Protocol Data Unit (PDU) session associated with the UE.

In one exemplary aspect, the invention provides a base station apparatus comprising a controller and a transceiver, the controller being configured to: obtain information identifying a total integrity protected uplink data rate for a user equipment (UE); allocate a portion of the total integrity protected uplink data rate to a secondary node (SN); and notify the UE about said portion allocated to the SN.

In one exemplary aspect, the invention provides a user equipment (UE) comprising a controller and a transceiver, the controller being configured to: receive, from a base station apparatus, information identifying a portion, allocated to a secondary node (SN), of a total integrity protected uplink data rate for the UE.

In one exemplary aspect, the invention provides a user equipment (UE) comprising a controller and a transceiver, the controller being configured to: transmit integrity protected data on a Data Radio Bearer (DRB); determine, based on a maximum integrity protected uplink data rate for the UE, a recommended maximum bit rate for integrity protected uplink transmissions for the DRB; and send, to a base station apparatus, a Medium Access Control (MAC) control element (CE) comprising information identifying said recommended maximum bit rate for integrity protected uplink transmissions for the DRB.

In one exemplary aspect, the invention provides a base station apparatus comprising a central unit (CU), and one or more distributed units (DUs) for handling user-plane transmissions for a user equipment (UE), the base station apparatus comprising: means for obtaining, for a Data Radio Bearer (DRB), an integrity protected data rate for a Protocol Data Unit (PDU) session associated with the UE; and means for sending information identifying said integrity protected data rate, from the CU to at least one DU, when setting up or modifying a user context associated with the UE.

In one exemplary aspect, the invention provides a distributed unit (DU) of a distributed base station apparatus handling user-plane transmissions for a user equipment (UE), the DU comprising: means for receiving, from a central unit (CU) when setting up or modifying a user context associated with the UE, information identifying an integrity protected data rate, for a Data Radio Bearer (DRB), for a Protocol Data Unit (PDU) session associated with the UE.

In one exemplary aspect, the invention provides a base station apparatus comprising: means for obtaining information identifying a total integrity protected uplink data rate for a user equipment (UE); means for allocating a portion of the total integrity protected uplink data rate to a secondary node (SN); and means for notifying the UE about said portion allocated to the SN.

In one exemplary aspect, the invention provides a user equipment (UE) comprising: means for receiving, from a base station apparatus, information identifying a portion, allocated to a secondary node (SN), of a total integrity protected uplink data rate for the UE.

In one exemplary aspect, the invention provides a user equipment (UE) comprising: means for transmitting integrity protected data on a Data Radio Bearer (DRB); means for determining, based on a maximum integrity protected uplink data rate for the UE, a recommended maximum bit rate for integrity protected uplink transmissions for the DRB; and means for sending, to a base station apparatus, a Medium Access Control (MAC) control element (CE) comprising information identifying said recommended maximum bit rate for integrity protected uplink transmissions for the DRB.

Exemplary aspects of the invention extend to corresponding systems and computer program products such as computer readable storage media having instructions stored thereon which are operable to program a programmable processor to carry out a method as described in the exemplary aspects and possibilities set out above or recited in the claims and/or to program a suitably adapted computer to provide the apparatus recited in any of the claims.

Each feature disclosed in this specification (which term includes the claims) and/or shown in the drawings may be incorporated in the invention independently of (or in combination with) any other disclosed and/or illustrated features. In particular but without limitation the features of any of the claims dependent from a particular independent claim may be introduced into that independent claim in any combination or individually.

BRIEF DESCRIPTION OF DRAWINGS

Exemplary embodiments of the invention will now be described, by way of example, with reference to the accompanying drawings in which:

FIG. 10 illustrates schematically an exemplary MAC control element in accordance with an exemplary embodiment of the present invention.

DESCRIPTION OF EMBODIMENTS

Overview

Under the 3GPP standards, a NodeB (or an 'eNB' in LTE, 'gNB' in 5G) is a base station via which communication devices (user equipment or 'UE') connect to a core network and communicate to other communication devices or remote servers. Communication devices might be, for example, mobile communication devices such as mobile telephones, smartphones, smart watches, personal digital assistants, laptop/tablet computers, web browsers, e-book readers, and/or the like. Such mobile (or even generally stationary) devices are typically operated by a user (and hence they are often collectively referred to as user equipment, 'UE') although it is also possible to connect IoT devices and similar MTC devices to the network. For simplicity, the present application will use the term base station to refer to any such base stations and use the term mobile device or UE to refer to any such communication device.

Although for efficiency of understanding for those of skill in the art, the invention will be described in detail in the context of a 3GPP system (a 5G network), the principles of the invention can be applied to other systems in which slice scheduling is performed.

Figure 1:
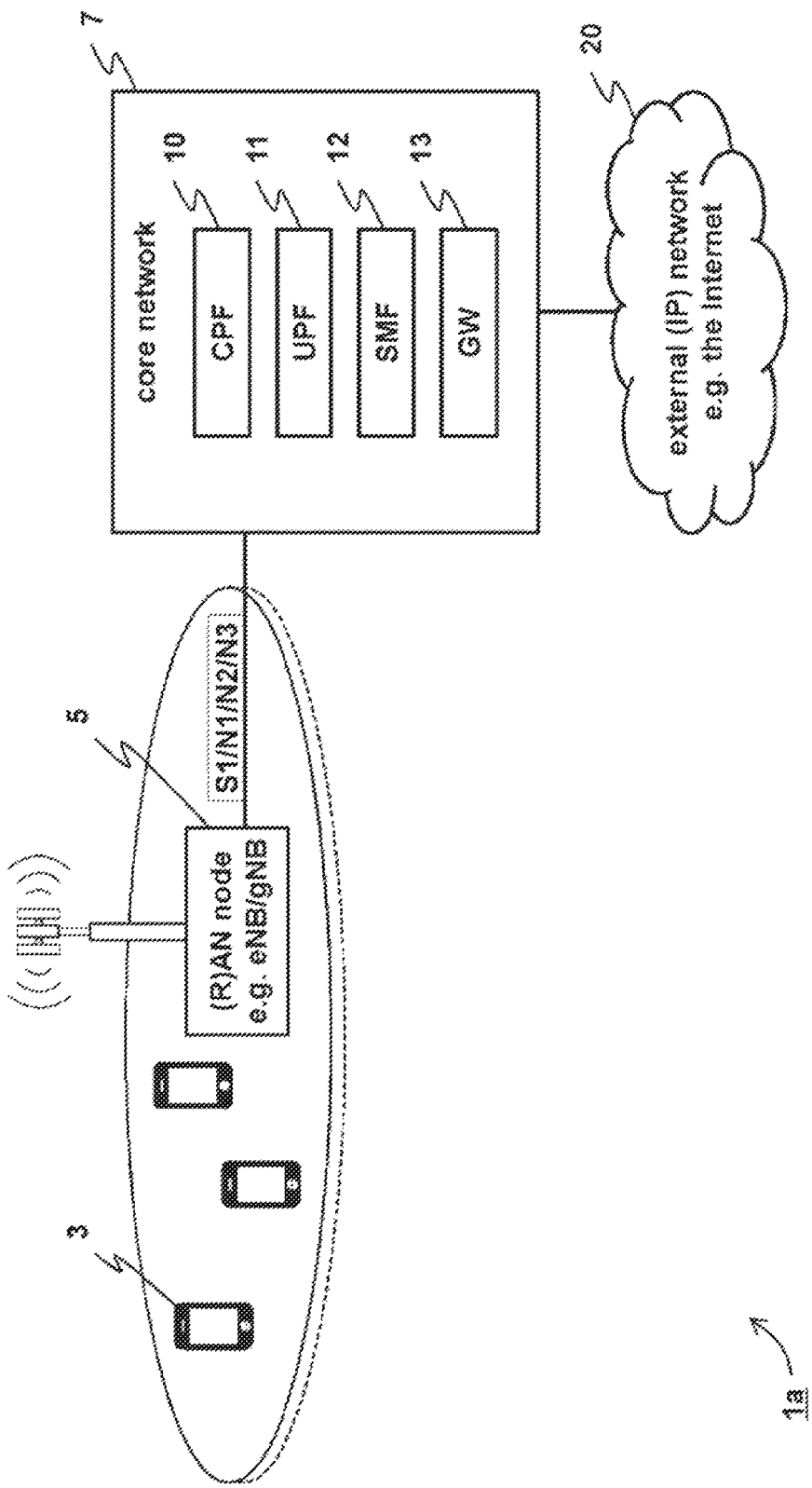
FIG. 1 illustrates schematically a generic mobile (cellular or wireless) telecommunication system to which exemplary embodiments of the invention may be applied.

FIG. 1 illustrates schematically a mobile (cellular or wireless) telecommunication system 1a to which exemplary embodiments of the invention may be applied.

In this network, users of mobile devices 3 (UEs) can communicate with each other and other users via respective base stations 5 and a core network 7 using an appropriate 3GPP radio access technology (RAT), for example, an E-UTRA and/or 5G RAT. It will be appreciated that a number of base stations 5 form a (radio) access network or (R)AN. As those skilled in the art will appreciate, whilst three mobile devices 3 and one base station 5 are shown in FIG. 1 for illustration purposes, the system, when implemented, will typically include other base stations and mobile devices (UEs).

A base station 5 that supports E-UTRA/4G protocols may be referred to as an 'eNB' and a base station 5 that supports NextGeneration/5G protocols may be referred to as a 'gNBs'. The base station 5 in FIG. 1 is configured to operate in accordance with next generation (5G) standards. However, it will be appreciated that the base station 5 may be configured to support both 4G and 5G, and/or any other 3GPP or non-3GPP communication protocols.

Neighbouring base stations 5 are connected to each other via an appropriate base station to base station interface (such as the so-called 'Xn' interface, the 'X2' interface, and/or the like). The base stations 5 are connected to the core network nodes via an appropriate interface (such as the so-called 'S1', 'N1', 'N2', 'N3' interface, and/or the like).

The core network 7 (e.g. the 5GC in case of NR/5G or the EPC in case of LTE) typically includes logical nodes (or 'functions') for supporting communication in the telecommunication system 1a, and for subscriber management, mobility management, charging, security, call/session management (amongst others). For example, the core network 7 of a 'Next Generation'/5G system will include, amongst other functions, control plane functions (CPFs) 10 and user plane functions (UPFs) 11. It will be appreciated that a CPF 10 may be configured to provide one or more of the following (amongst others): a Session Management Function (SMF) 12 (shown separately in FIG. 1), an Access and Mobility Function (AMF), a Policy Control Function (PCF), an Operations and Maintenance (OAM) function, an Application Function (AF), and/or a Network Function (NF). The core network 7 also comprises at least one gateway (GW) 13 (e.g. a serving gateway) for coupling the core network 7 to the RAN (base station 5) and to an external network 20 (typically an Internet Protocol (IP) network, such as the Internet).

When the UE 3 initiates a PDU session via its serving base station 5, the base station 5 checks whether the PDU session requires integrity protection and whether it is necessary to enforce a maximum data rate for the UE's integrity protected Data Radio Bearers (DRBs) terminated at that base station 5. Specifically, the base station 5 applies User Plane security policies for a PDU session based on the relevant User Plane Security Enforcement information (when the relevant User Plane Security Enforcement information indicates that UP integrity protection is 'Required' or 'Preferred').

There are separate maximum integrity protected data rate values for the UE's uplink and downlink communications (although these values may be the same, depending on the UE's capability). In order to inform the base station 5 about the applicable maximum integrity protected uplink and downlink data rates for a PDU session for a given UE 3, the core network 7 (e.g. the AMF) sends the data rate values to the base station 5 when setting up the PDU session. Specifically, the applicable uplink and downlink data rate values are included in the 'Maximum Integrity Protected Data Rate Uplink' IE and the 'Maximum Integrity Protected Data Rate Downlink' IE, respectively, in the 'PDU Session Resource Setup Request' message to the base station 5.

Figure 2:
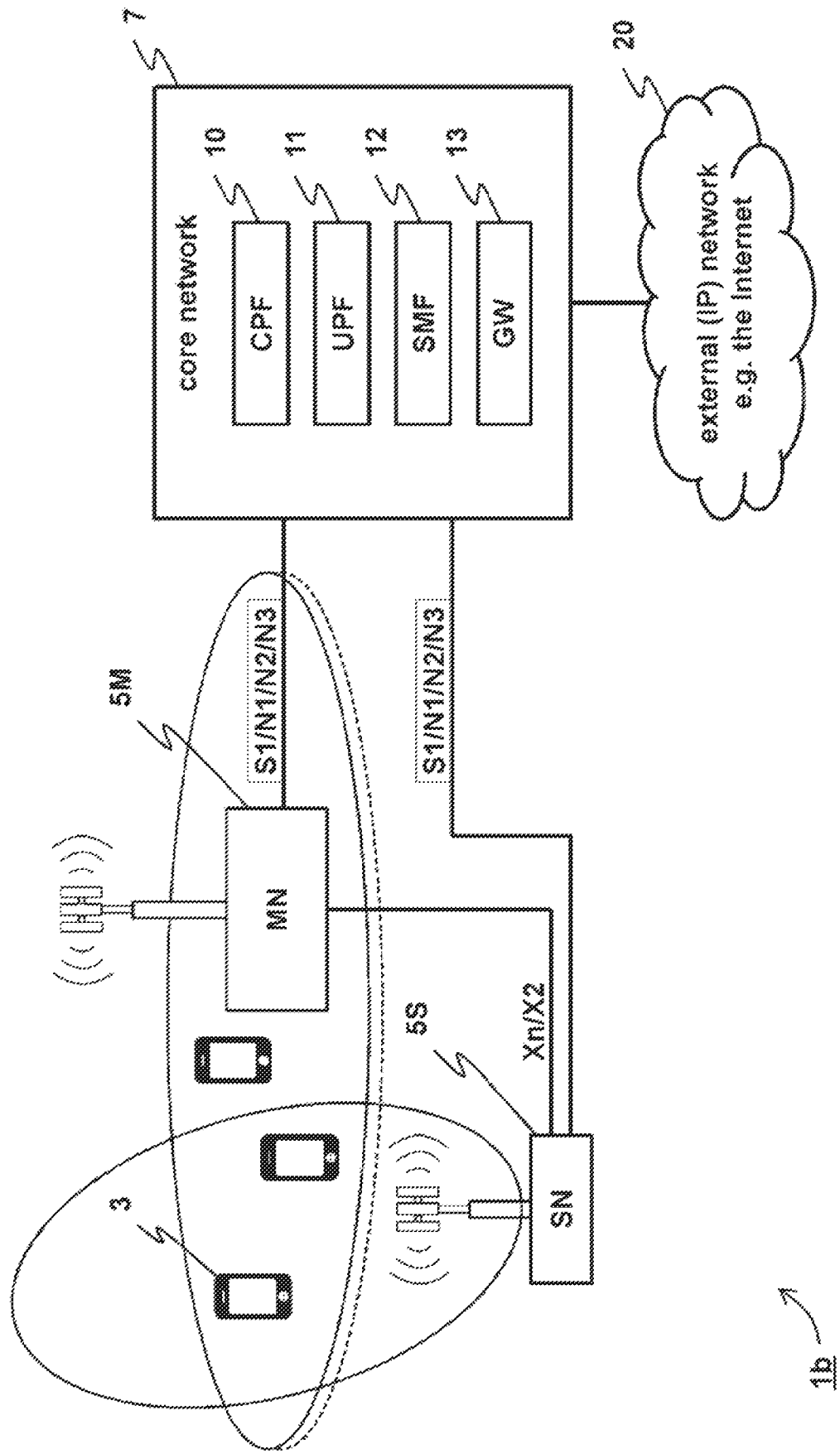
FIG. 2 illustrates schematically a mobile (cellular or wireless) telecommunication system, including a master node and a secondary node, to which exemplary embodiments of the invention may be applied.

Turning now to FIG. 2, the mobile (cellular or wireless) telecommunication system 1b of this figure is effectively the same as the one shown in FIG. 1. However, the UE 3 in this case is served by a base station configured as a master node (MN) 5M and by a base station configured as a secondary node (SN) 5S. In this case, the MN 5M checks whether the PDU session requires integrity protection and whether it is necessary to enforce a maximum data rate for the UE's integrity protected Data Radio Bearers (DRBs) via the MN 5M and SN 5S serving the UE 3. Specifically, the MN 5M applies User Plane security policies for a PDU session based on the relevant User Plane Security Enforcement information (when it is set to 'Required' or 'Preferred').

Figure 3:
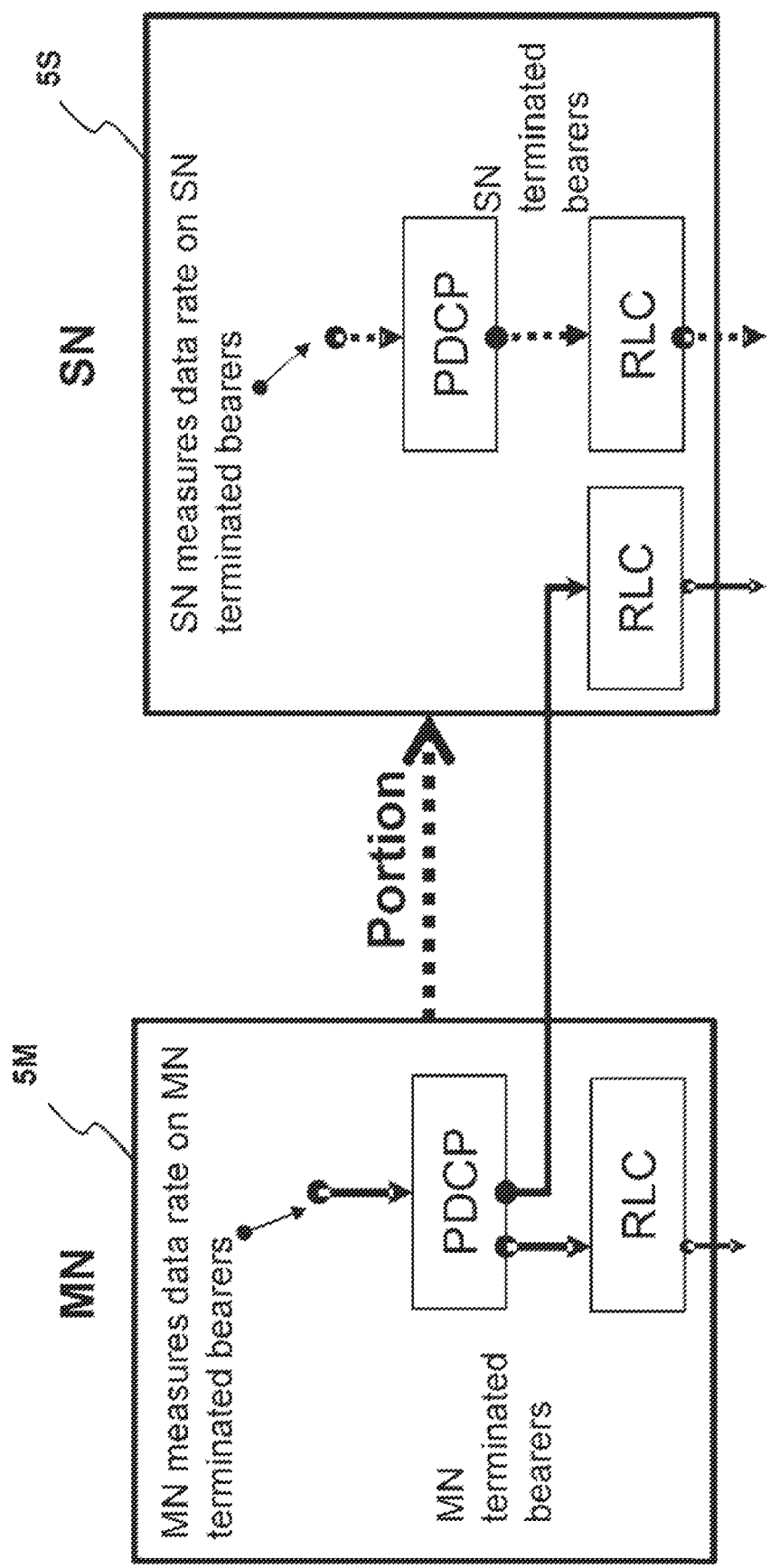
FIG. 3 illustrates further details of a master node and a secondary node in the system shown in FIG. 2.

As shown in FIG. 3, both the MN 5M and the SN 5S host respective parts of the Radio Link Control (RLC) and the Packet Data Convergence Protocol (PDCP) layer for the DRB(s) served by that node (for the UE's User Plane). Although not shown in FIG. 3, it will be appreciated that the MN 5M and the SN 5S will also host corresponding lower layers such as the Medium Access Control (MAC) layer and the Physical (PHY) layer for their DRBs.

When (at least some of) the UE's DRBs are terminated at an SN 5S, the UE's uplink and downlink data rate capabilities for integrity protected DRBs are signalled by the MN 5M to the SN 5S over the Xn interface (e.g. at SN addition and modification). The MN 5M measures the integrity protected downlink data rate on bearers (DRBs) terminated at the MN 5M and the SN 5S measures the integrity protected downlink data rate on bearers (DRBs) terminated at the SN 5S in order to ensure that the overall downlink data rate does not exceed the UE's downlink data rate capability for integrity protected DRBs. It will be appreciated that the MN 5M may also signal a "portion" of the (total) UE maximum IP data rate for enforcement by the SN 5S (or signal respective portions/sub-portions to multiple SNs if appropriate), separately for the uplink and downlink. Although the UE 3 is not shown in FIG. 3, it will be appreciated that the UE 3 also measures the integrity protected uplink data rate in order to ensure that the overall uplink data rate does not exceed the UE's uplink data rate capability for integrity protected DRBs.

Figure 4:
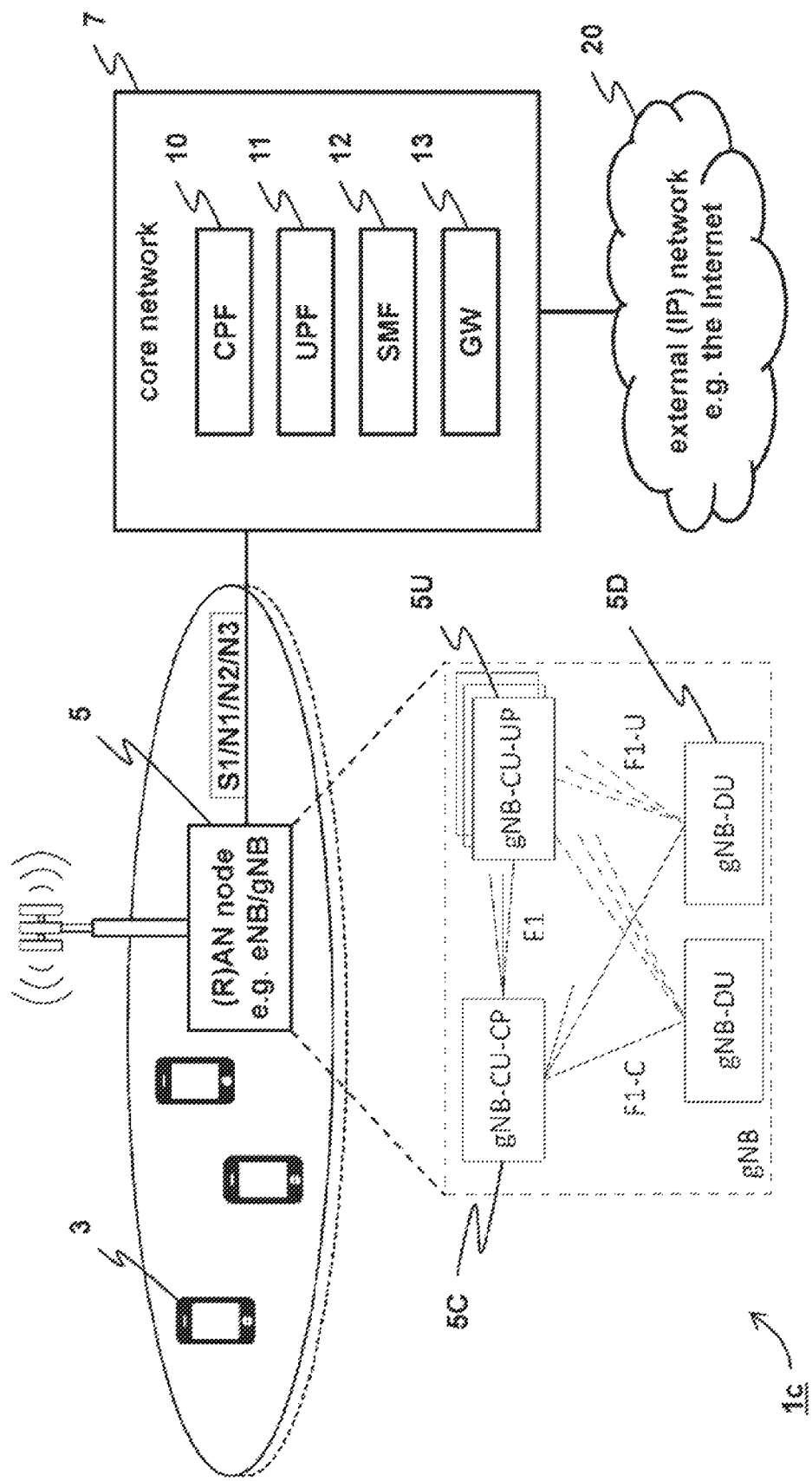
FIG. 4 illustrates schematically a mobile (cellular or wireless) telecommunication system, including a distributed base station, to which exemplary embodiments of the invention may be applied.
Figure 5:
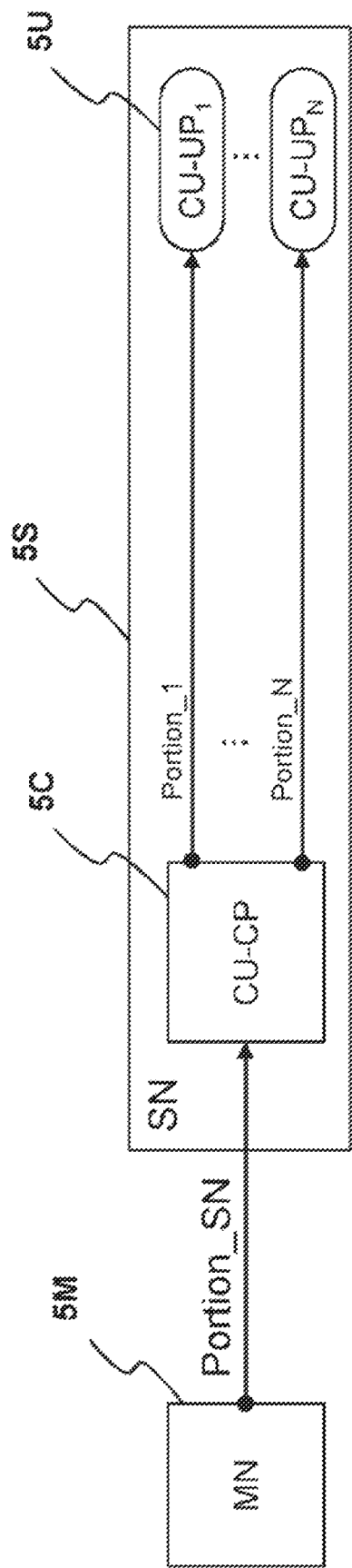
FIG. 5 illustrates further details of the distributed base station in the system shown in FIG. 4.

FIG. 4 illustrates a scenario in which the UE 3 is served by a distributed base station 5 (a distributed gNB). The distributed gNB 5 in the mobile (cellular or wireless) telecommunication system 1c comprises a central unit for the control plane (gNB-CU-CP) 5C, at least one central unit for the user plane (gNB-CU-UP) 5U, and a plurality of distributed units (gNB-DU) 5D each serving at least one associated cell. It will be appreciated that some components of the distributed gNB 5 (e.g. the gNB-CU-CP 5C and/or at least one the gNB-CU-UP 5U function) may be provided in the core network 7, if appropriate. Although separate functions with specific names are described for illustrative purposes, the corresponding functionality may be implemented in isolation or combination by one or more suitable nodes implemented using dedicated circuitry and/or software instructions for controlling an associated processor.

The various sub-units (functions) of the distributed gNB 5 are coupled via appropriate interfaces as follows: the gNB-CU-CP 5C is connected to the gNB-DU 5D through the F1-C interface; the gNB-CU-UP 5U is connected to the gNB-DU 5D through the F1-U interface; and the gNB-CU-UP 5U is connected to the gNB-CU-CP 5C through the E1 interface. The mobile device 3 and the base station 5 are connected via an appropriate air interface (for example the so-called 'Uu' interface and/or the like). The distributed base station 5 is also connected to the core network nodes via an appropriate interface (such as the so-called 'S1', 'N1', 'N2', 'N3' interface, and/or the like).

In the above described systems 1a to 1c, the components are configured to co-operatively enforce the UE's uplink and downlink maximum data rate(s) for integrity protected Data Radio Bearers (DRBs).

In one exemplary embodiment, a DRB level Uplink Integrity Protected Data Rate (for a given UE) is signalled to the gNB-DU 5D through the F1 (F1-C) interface, using an appropriate information element when setting up (and/or modifying) the UE context associated with the concerned DRB.

Beneficially, the UE's UL Maximum Integrity Data Rate can be taken into account (by the MAC entity of the SN 5S) during assignment of UL scheduling grant(s). Accordingly, it is possible to avoid assignment of a grant for UL traffic that is not suitable for the UE's Maximum IP Data Rate (e.g. an assigned grant that would result in an uplink rate that exceeds the UE's maximum integrity protected data rate).

In another exemplary embodiment, the UE 3 is informed about the portion of the UE UL Maximum Integrity Protected data rate allocated to the SN 5S (by the MN 5M). Since the UE 3 knows the total (for all DRBs) UE UL Maximum Integrity Protected data rate, it can derive the 'remaining' portion for the MN 5M from the total UE UL Maximum Integrity Protected data rate and the SN's portion.

As a variation of this exemplary embodiment, an appropriate UE UL Maximum Integrity Protected data rate may be assigned for each DRB, on a DRB level. In this case, the UE 3 can derive the MN and SN specific portions from the DRB level UE UL Maximum Integrity Protected data rates (e.g. derive the MN specific portion by summing the values for those DRBs that are provided via the MN, and derive the SN specific portion by summing the values for those DRBs that are provided via the SN).

Based on the MN and the SN portions of the UE UL Maximum Integrity Protected Data Rate (and/or the DRB level values), the UE 3 is able to enforce the UE UL Integrity Protected data rate for its MN-terminated and SN-terminated bearers.

In yet another exemplary embodiment, the UE 3 is configured to indicate, to the base station 5 a recommended maximum bit rate for the uplink, using a field of an appropriate MAC control element (CE). Thus, even when the data rate changes (for a given DRB), the UE 3 is able to re-distribute the portions among its MN and SN bearers, and the base station 5 can be made aware of these changes.

User Equipment (UE)

Figure 6:
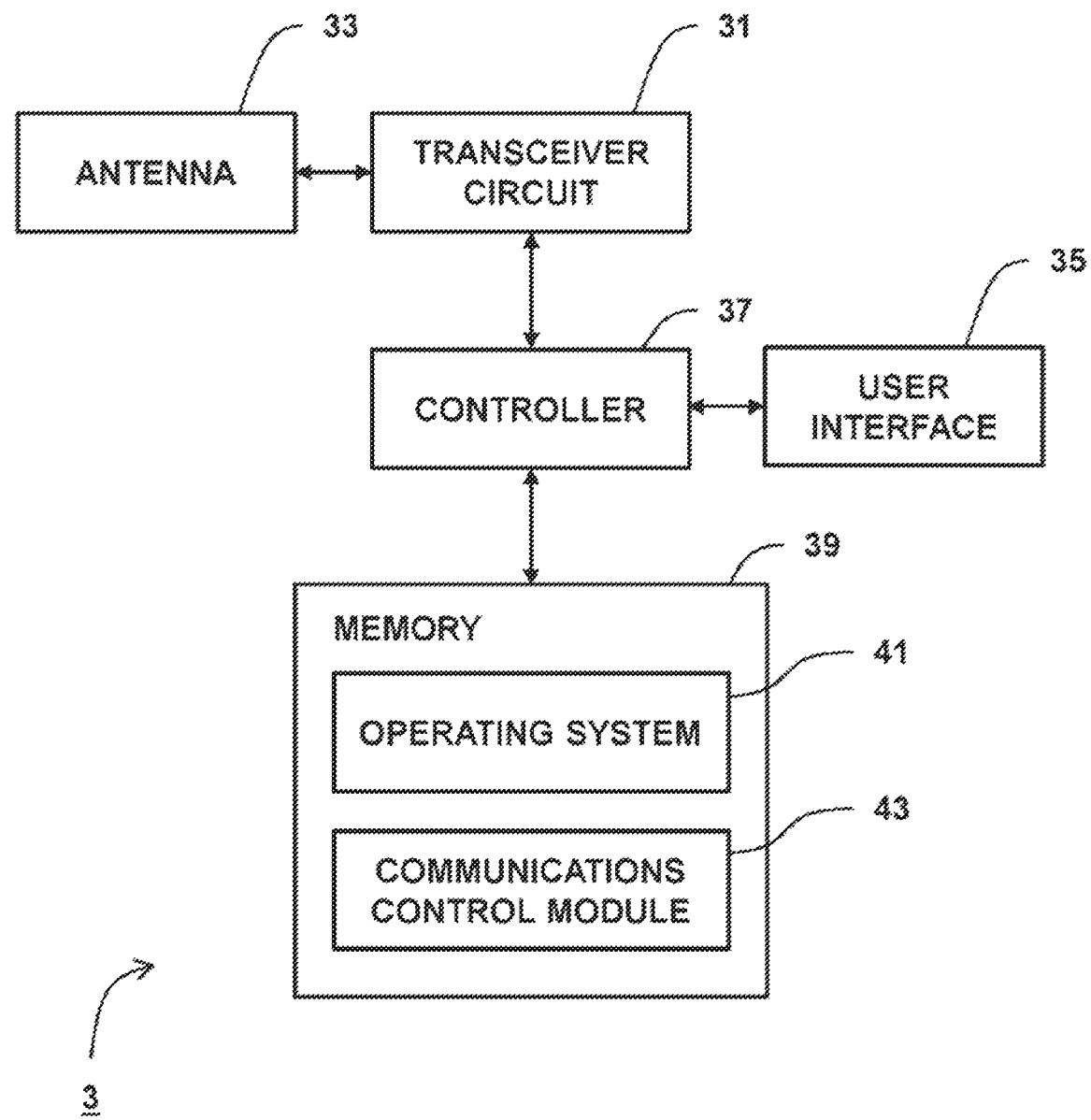
FIG. 6 is a schematic block diagram of a mobile device (user equipment) forming part of the systems shown in FIGS. 1, 2, and 4.

FIG. 6 is a block diagram illustrating the main components of the mobile device (UE) 3 shown in FIGS. 1a to 1c. As shown, the UE 3 includes a transceiver circuit 31 which is operable to transmit signals to and to receive signals from the connected node(s) via one or more antenna 33. Although not necessarily shown in FIG. 6, the UE 3 will of course have all the usual functionality of a conventional mobile device (such as a user interface 35) and this may be provided by any one or any combination of hardware, software and firmware, as appropriate. A controller 37 controls the operation of the UE 3 in accordance with software stored in a memory 39. The software may be pre-installed in the memory 39 and/or may be downloaded via the telecommunication network 1 or from a removable data storage device (RMD), for example. The software includes, among other things, an operating system 41, and at least a communications control module 43. The communications control module 43 is responsible for handling (generating/sending/receiving) signalling messages and uplink/downlink data packets between the UE 3 and other nodes, including (R)AN nodes 5 and core network nodes. Such signalling messages may include appropriately formatted messages and information elements for indicating the UE's maximum supported data rate for integrity protected DRBs. The indication may be provided to the core network 7 at the Non-Access Stratum (NAS) layer, via the RAN node 5 serving the UE 3.

Base Station

Figure 7:
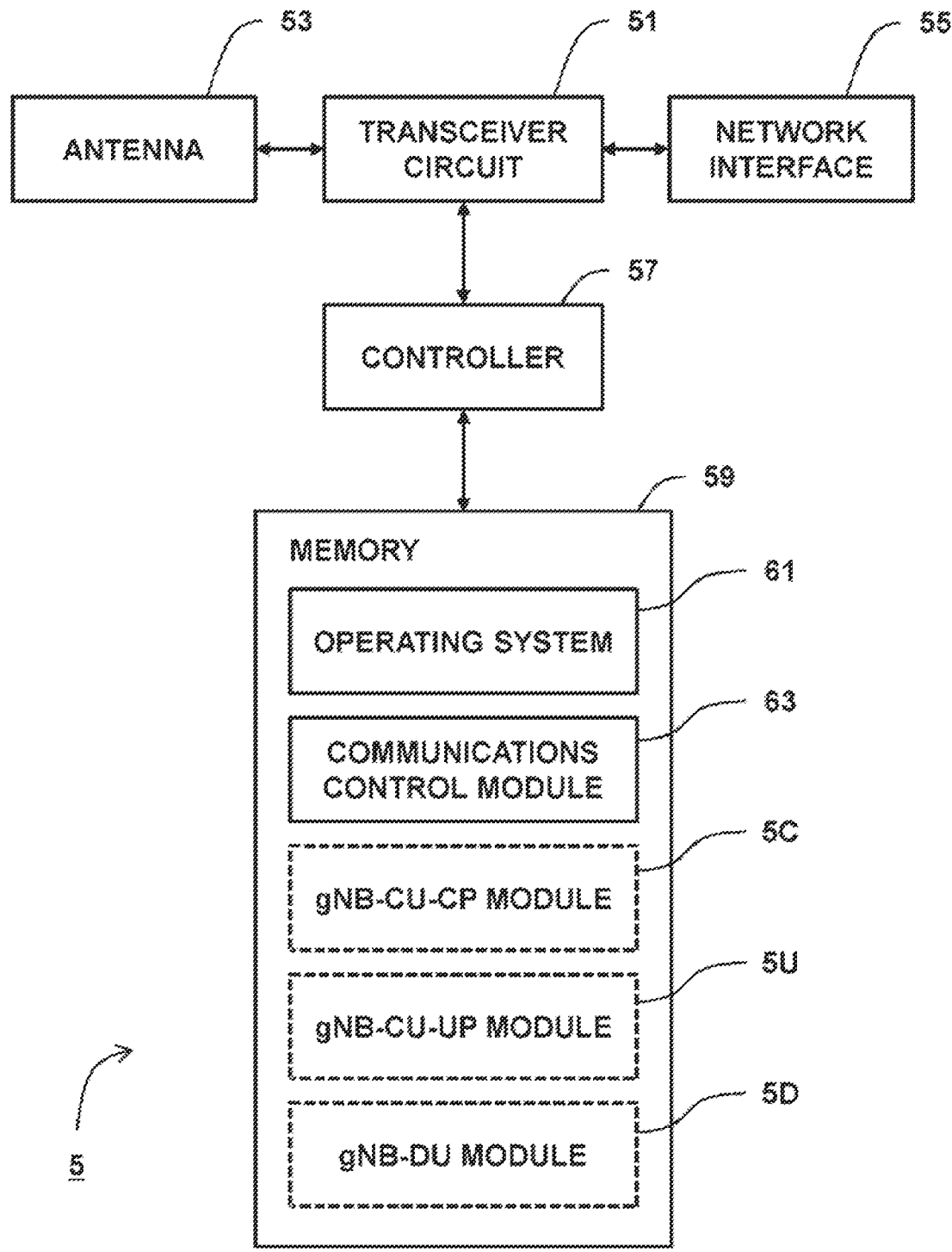
FIG. 7 is a schematic block diagram of a base station apparatus forming part of the systems shown in FIGS. 1, 2, and 4.

FIG. 7 is a block diagram illustrating the main components of the base station apparatus 5 shown in FIGS. 1a to 1c. As shown, the base station 5 includes a transceiver circuit 51 which is operable to transmit signals to and to receive signals from connected UE(s) 3 via one or more antenna 53 and to transmit signals to and to receive signals from other network nodes (either directly or indirectly) via a network interface 55. The network interface 55 typically includes an appropriate base station—base station interface (such as X2/Xn) and an appropriate base station—core network interface (such as S1/N1/N2/N3).

A controller 57 controls the operation of the base station 5 in accordance with software stored in a memory 59. The software may be pre-installed in the memory 59 and/or may be downloaded via the telecommunication network 1 or from a removable data storage device (RMD), for example. The software includes, among other things, an operating system 61, and at least a communications control module 63.

The communications control module 63 is responsible for handling (generating/sending/receiving) signalling between the base station 5 and other nodes, such as the UE 3 and the core network nodes. Such signalling messages may include appropriately formatted messages and information elements relating to the maximum data rate for integrity protected DRBs supported by a particular UE 3 served by the base station 5.

When the base station 5 operates as a MN 5M or an SN 5S, the communications control module 63 is also responsible for handling (generating/sending/receiving) signalling messages and information elements that are appropriate for the current operation of the base station 5.

When the base station 5 comprises a distributed gNB or En-gNB, the network interface 55 also includes an E1 interface and an F1 interface (F1-C for the control plane and F1-U for the user plane) to communicate signals between respective functions of the distributed gNB or En-gNB. In this case, the software also includes at least one of: a gNB-CU-CP sub-module 5C, a gNB-CU-UP sub-module 5U, and a gNB-DU sub-module 5D. In this case, each sub-module is responsible for handling (generating/sending/receiving) signalling messages and information elements in accordance with the functionality provided by that sub-module.

Core Network Node

Figure 8:
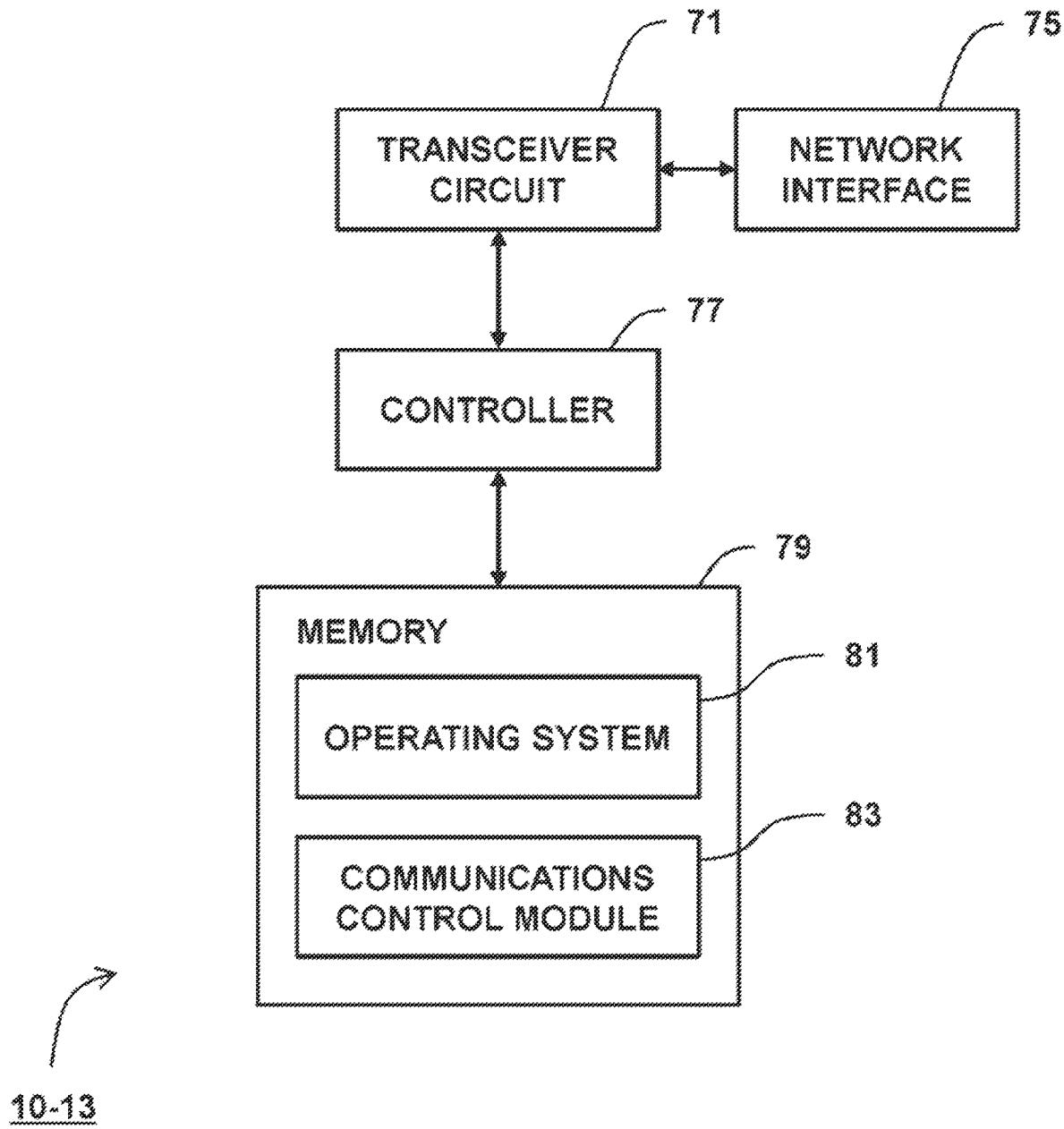
FIG. 8 is a schematic block diagram of a core network node forming part of the systems shown in FIGS. 1, 2, and 4.

FIG. 8 is a block diagram illustrating the main components of an exemplary core network node, such as the SMF 12 shown in FIGS. 1a to 1c. As shown, the core network node includes a transceiver circuit 71 which is operable to transmit signals to and to receive signals from other nodes (including the UE 3, the base station 5, and other core network nodes) via a network interface 75. A controller 77 controls the operation of the core network node in accordance with software stored in a memory 79. The software may be pre-installed in the memory 79 and/or may be downloaded via the telecommunication network 1 or from a removable data storage device (RMD), for example. The software includes, among other things, an operating system 81, and at least a communications control module 83.

The communications control module 83 is responsible for handling (generating/sending/receiving) signaling between the core network node and other nodes, such as the UE 3, the base station 5, and other core network nodes.

In the above description, the mobile telephone, the UE, the base station, and core network node are described for ease of understanding as having a number of discrete modules. Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities. These modules may also be implemented in software, hardware, firmware or a mix of these.

DETAILED DESCRIPTION

A number of procedures will now be described, by way of example only, which may be implemented to allow enforcement of the applicable maximum data rate for integrity protected DRBs in the above described systems 1a to 1c. It will be appreciated that whilst each of these procedures may provide technical benefits independently when implemented in isolation, any combination of these procedures may be implemented together.

A more detailed description of some exemplary embodiments is provided below with reference to FIGS. 9 and 10.

In the following exemplary embodiments, the term "portion" refers to a portion of a UE specific maximum data rate to be enforced at a node for integrity protected DRBs terminated at that node. The "portion" is effectively a (hard) limit for the UE's maximum data rate for integrity protected traffic on SN terminated PDU sessions (at least one PDU session).

First Exemplary Embodiment (Signalling Over F1 Interface)

In this exemplary embodiment, a DRB level Uplink Integrity Protected Data Rate (for a given UE) is signalled to the gNB-DU 5D through the F1 (F1-C) interface, using an appropriate information element (e.g. a 'UL DRB Integrity Protected Data Rate' IE and/or the like) when setting up (or modifying) the UE context associated with the concerned DRB.

In more detail, after the MN 5M and SN 5S derive the DRB level information (from the UE UL Maximum Integrity Protected Data Rate), this information is conveyed in an information element in the F1AP:UE Context Setup Request message, the UE Context Modification Request, and/or any other suitable message. This allows the gNB-DU 5D to perform admission control of the UE Maximum Integrity Protected data rates, in the uplink and downlink, at DRB level. Based on this information, the MAC entity of the gNB-DU 5D can allocate appropriate uplink and downlink resources for the UE's DRBs (i.e. up to but not exceeding the respective UE Maximum Integrity Protected data rate).

In one example, the DRB level UE UL Maximum Integrity Protected Data rate is included in the "DRB QoS" IE (in the F1AP:UE Context Setup Request message). This may be implemented under the "QoS Flow Level QoS Parameters" IE, by adding an "UL DRB Integrity Protected Data Rate" IE as show in Table 1 below. However, it will be appreciated that other suitable information elements (and/or other messages) may also be used, if appropriate.

TABLE 1

QoS Flow Level QoS Parameters IE

| IE/Group Name | Presence | Range | IE type and reference | Semantics description |
| --- | --- | --- | --- | --- |
| CHOICE QoS Characteristics | M | | | |
| >Non-dynamic 5QI | | | | |
| >>Non Dynamic 5QI Descriptor | M | | 9.3.1.49 | |
| >Dynamic 5QI | | | | |
| >>Dynamic 5QI Descriptor | M | | 9.3.1.47 | |
| NG-RAN Allocation and Retention Priority | M | | 9.3.1.48 | |

TABLE 1-continued

QoS Flow Level QoS Parameters IE

| IE/Group Name | Presence | Range | IE type and reference | Semantics description |
| --- | --- | --- | --- | --- |
| GBR QoS Flow Information | O | | 9.3.1.46 | This IE shall be present for GBR QoS Flows only. |
| Reflective QoS Attribute | O | | ENUMERATED (subject to, . . .) | Details in 3GPP TS 23.601. This IE applies to non-GBR flows only and shall be ignored otherwise. |
| PDU Session ID | O | | INTEGER (0 . . . 255) | As specified in 3GPP TS 23.501. |
| UL PDU Session Aggregate Maximum Bit Rate | O | | Bit Rate 9.3.1.22 | The PDU session Aggregate Maximum Bit Rate Uplink which is associated with the involved PDD session. |
| UL DRB Integrity Protected Data Rate | O | | Bit Rate 9.3.1.22 | The DRB level Uplink Integrity Protected Data Rate. |

Further details of the UE context setup and UE context modification procedures are provided in the Annex appended at the end of the description.

Second Exemplary Embodiment (Signalling to UE)

In this exemplary embodiment, the UE 3 is informed about the portion of the UE UL Maximum Integrity Protected data rate allocated to the SN 5S (by the MN 5M).

In a first option, a total "portion" (i.e. a portion of the UE UL Maximum Integrity Protected data rate for all DRBs via the SN 5S) is given by the MN 5M to the SN 5S (and to the UE 3 by the SN 5S). Since the UE 3 knows the total UE UL Maximum Integrity Protected data rate (for all DRBs), it can derive the 'remaining' portion for the MN 5M (i.e. the 'Master Cell Group' (MCG) portion) from the total UE UL Maximum Integrity Protected data rate and the SN's portion (for example by deducting the SN's portion from the total UE UL Maximum Integrity Protected data rate).

In order to notify the UE 3 about the SN's portion of the total UE UL Maximum Integrity Protected data rate, an appropriately formatted RRCConnectionReconfiguration message (specified in 3GPP TS 38.331 V 15.3.0) is sent to the UE as part of the Secondary Node addition procedure. The RRCConnectionReconfiguration message indicates UE UL Maximum Integrity Protected data rate portion allocated for the SN (e.g. under the SCG ('Secondary Cell Group') configuration). For example, the RRCReconfiguration message may include the following information elements:

TABLE 2

```
RRCReconfiguration ::=          SEQUENCE {
    mc-TransactionIdentifier RRC-
    TransactionIdentifier,
    criticalExtensions              CHOICE {
        mcReconfiguration RRCReconfiguration-IEs,
        criticalExtensions-         SEQUENCE { }
        Future
    }
}
```

TABLE 2-continued

```
RRCReconfiguration-IEs ::= SEQUENCE {
  radioBearerConfig OPTIONAL, --Need M
  secondaryCellGroup OCTET STRING
    (CONTAINING CellGroupConfig)
    OPTIONAL, --Need M
  measConfig MeasConfig OPTIONAL, --Need M
  lateNonCriticalExtension OCTET STRING OPTIONAL,
  nonCriticalExtension RRCReconfiguration-
    v1630-IEs OPTIONAL
}
RRCReconfiguration-v1530-IEs ::= SEQUENCE {
  masterCellGroup                      OCTET STRING
    (CONTAINING CellGroupConfig)
    OPTIONAL, --Need M
  fullConfig                           ENUMERATED
    (true) OPTIONAL, --Cond
    FullConfig
  dedicatedNAS-MessageList     SEQUENCE (SIZE(1..
    maxDRB)) OF DedicatedNAS-Message
    OPTIONAL, --Cond nonHO
  masterKeyUpdate MasterKeyUpdate
    OPTIONAL, --Cond MasterKeyChange
  dedicatedSIB1-Delivery OCTET STRING
    (CONTAINING SystemInformation)
    OPTIONAL, --Need M
  otherConfig OtherConfig OPTIONAL, --Need M
  nonCriticalExtension RRCReconfiguration-
    v1530a0-IEs OPTIONAL
}
RRCReconfiguration-v1530-IEs ::= SEQUENCE {
  secondaryCellGroup-                  INTEGER
  PortionPercentage                    (0..100) OPTIONAL,
  nonCriticalExtension                 SEQUENCE { } OPTIONAL
}
```

As can be seen, in this example, the RRCConnectionReconfiguration message includes a 'secondaryCellGroupPortionPercentage' information element which is configurable to indicate the applicable UE UL Maximum Integrity Protected data rate portion allocated for the SN 5S (for all DRBs via the SN 5S). In this example, the UE UL Maximum Integrity Protected data rate portion is indicated as a percentage (of the total UE UL Maximum Integrity Protected data rate). However, it will be appreciated that a specific data rate value may also be used, if appropriate.

In a second option, an appropriate DRB level UE UL Maximum Integrity Protected data rate is assigned by the MN 5M and SN 5S for each DRB (i.e. for each 'Master Cell Group' (MCG) bearer and for each 'Secondary Cell Group' (SCG) bearer).

In order to notify the UE 3 about the DRB level UE UL Maximum Integrity Protected data rate, an appropriately formatted RRCConnectionReconfiguration message is sent to the UE as part of the Secondary Node addition procedure. In this option, the RRCConnectionReconfiguration message indicates the applicable UE UL Maximum Integrity Protected data rate portion allocated per logical channel (e.g. under the LogicalChannelConfig). For example, the RRCReconfiguration message may include the following information elements:

```
RRCReconfiguration ::=                   SEQUENCE {
  rrc-TransactionIdentifier              RRC-TransactionIdentifier,
  criticalExtensions                     CHOICE {
    rrcReconfiguration                   RRCReconfiguration-IEs,
    criticalExtensionsFuture             SEQUENCE { }
  }
}
RRCReconfiguration-IEs ::=          SEQUENCE {
  radioBearerConfig        OPTIONAL, -- Need M
  secondaryCellGroup       OCTET STRING (CONTAINING CellGroupConfig) OPTIONAL, -- Need M
  measConfig  MeasConfig   OPTIONAL, -- Need M
  lateNon CriticalExtension   OCTET STRING   OPTIONAL,
  nonCriticalExtension    RRCReconfiguration-v1530-IEs    OPTIONAL
}
CellGroupConfig ::=                          SEQUENCE {
  cellGroupId                                CellGroupId,
  rlc-BearerToAddModList   SEQUENCE (SIZE(1..maxLC-ID)) OF RLC-BearerConfig   OPTIONAL, -- Need N
  rlc-BearerToReleaseList  SEQUENCE (SIZE(1..maxLC-ID)) OF LogicalChannelIdentity  OPTIONAL, -- Need N
  mac-CellGroupConfig  MAC-CellGroupConfig  OPTIONAL,  -- Need M
  physicalCellGroupConfig  PhysicalCellGroupConfig  OPTIONAL,  -- Need M
  spCellConfig        SpCellConfig  OPTIONAL,       -- Need M
  sCellToAddModList  SEQUENCE (SIZE (1..maxNrofSCells) OF SCellConfig OPTIONAL,  -- Need N
  sCellToReleaseList    SEQUENCE (SIZE (1..maxNrofSCells)) OF SCellIndex OPTIONAL,  -- Need N
  ...,
  [[
  reportUplinkTxDirectCurrent-v1530           ENUMERATED {true} OPTIONAL     -- Cond BWP-Reconfig
  ]]
}
RLC-BearerConfig ::=         SEQUENCE {
  mac-LogicalChannelConfig       LogicalChannelConfig                        OPTIONAL,
  -- Cond LCH-Setup
}
LogicalChannelConfig ::=   SEQUENCE {
  ul-SpecificParameters    SEQUENCE {
    priority               Priority,
    prioritisedBitRate         PrioritisedBitRate,
```

```
    bucketSizeDuration          BucketSizeDuration,
    logicalChannelGroup             INTEGER (0.3),
    maximumBitRate              PrioritisedBitRate   OPTIONAL,
  } OPTIONAL
}
```

As can be seen, in this example, the RRCConnectionReconfiguration message includes a 'maximumBitRate' information element which is configurable to indicate the applicable UE UL Maximum Integrity Protected data rate allocated for a given DRB.

Figure 9:
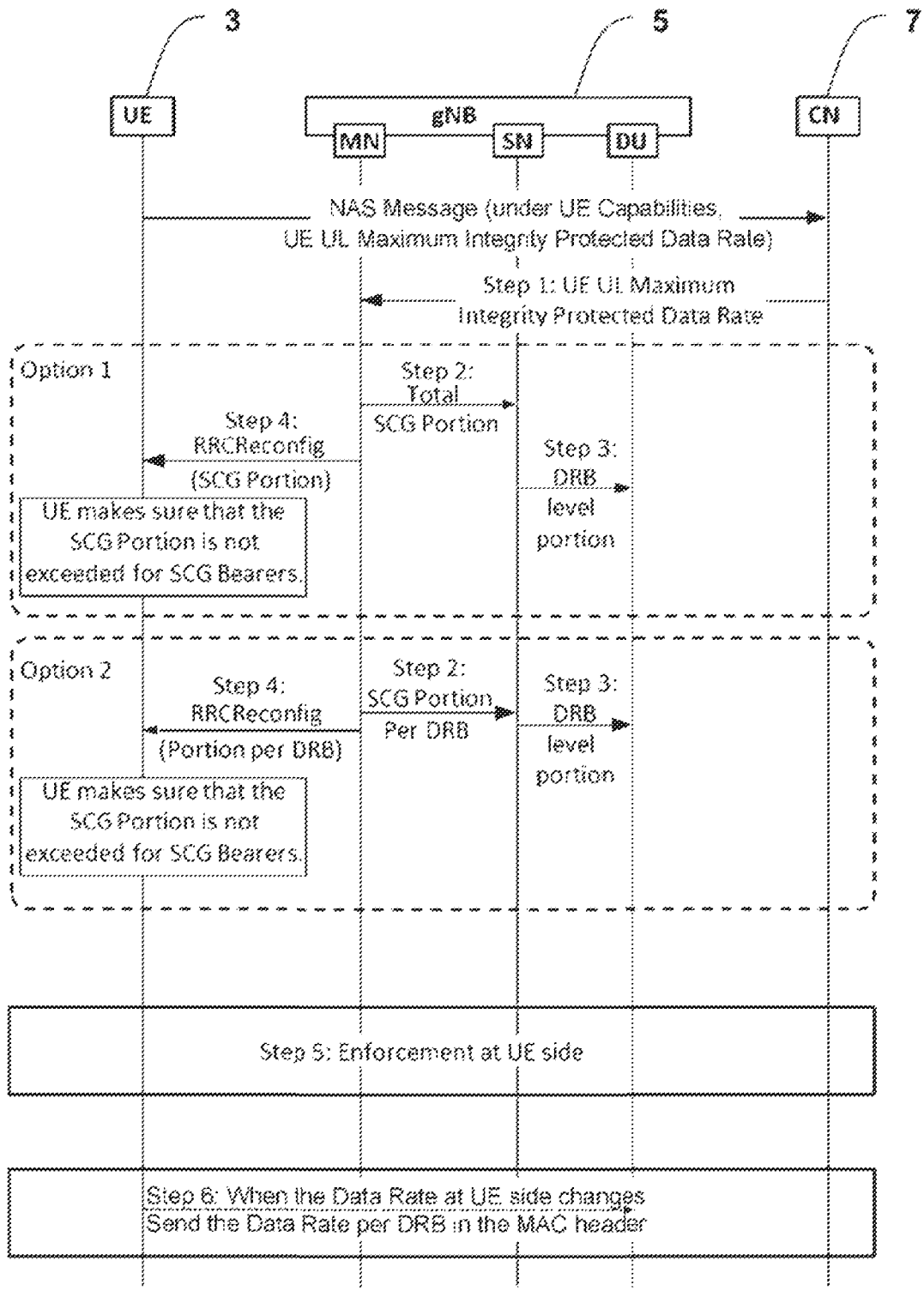
FIG. 9 illustrates schematically some exemplary ways in which an exemplary embodiment of the present invention may be implemented in the systems shown in FIGS. 1, 2, and 4.

FIG. 9 is an exemplary sequence diagram illustrating schematically some of the steps/messages and the components involved in the above described first and second options. It will be appreciated that Step 6 of FIG. 9 is optional, and this step may also be implemented separately from the rest of the procedure (as described below).

Third Exemplary Embodiment (Enforcement During the Data Transfer Phase)

Effectively, this exemplary embodiment corresponds to Step 6 of FIG. 9. In this exemplary embodiment, the UE 3 is configured to indicate, to the base station 5, using an appropriately formatted MAC CE, the recommended maximum bit rate for the uplink.

For example, the UE 3 may use the 'Recommended bit rate' MAC CE, in the uplink MAC header, to send to the base station 5 the recommended uplink bit rate (for the DRB to which the MAC header relates). It will be appreciated that the UE 3 may be configured to recommend a maximum bit rate on a logical channel basis (based on the instantaneous data rates at the UE 3).

Beneficially, based on (the sum of) the bit rates per logical channel, the base station 5 is able to derive the total rate for the MN and SN bearers, and use this information to determine an optimum grant for the UE's uplink traffic (i.e. a grant that does not result in exceeding the UE UL Maximum Integrity Protected data rate).

FIG. 10 illustrates schematically an exemplary MAC control element in accordance with the third exemplary embodiment. As can be seen, the "Bit Rate" field (e.g. 5 bits, maximum 8 bits) may be used to indicate the recommended MBR value in the uplink.

Modifications and Alternatives

Detailed exemplary embodiments have been described above. As those skilled in the art will appreciate, a number of modifications and alternatives can be made to the above exemplary embodiments whilst still benefiting from the inventions embodied therein. By way of illustration only a number of these alternatives and modifications will now be described.

It will be appreciated that the above exemplary embodiments may be applied to both 5G New Radio and LTE systems (Evolved Universal Terrestrial Radio Access Network, 'E-UTRAN').

It will be appreciated that whilst, in the above examples, a 'gNB' type base station is described, much of the functionality can be extended to other base stations (e.g. eNBs, ng-eNBs, En-gNBs, NG-RAN nodes) or similar apparatus for providing radio access to UEs such as mobile (cellular) telephones/smartphones, MTC/IoT devices, and/or other mobile or fixed location communication devices. Although not shown in FIGS. 1 to 4, the base station may also control one or more associated cells either directly or via other nodes such as home base stations, relays, remote radio heads, and/or the like.

In the above description, the UE, the base station, and the core network node are described for ease of understanding as having a number of discrete modules (such as the communication control modules). Whilst these modules may be provided in this way for certain applications, for example where an existing system has been modified to implement the invention, in other applications, for example in systems designed with the inventive features in mind from the outset, these modules may be built into the overall operating system or code and so these modules may not be discernible as discrete entities. These modules may also be implemented in software, hardware, firmware or a mix of these.

Each controller may comprise any suitable form of processing circuitry including (but not limited to), for example: one or more hardware implemented computer processors; microprocessors; central processing units (CPUs); arithmetic logic units (ALUs); input/output (IO) circuits; internal memories/caches (program and/or data); processing registers; communication buses (e.g. control, data and/or address buses); direct memory access (DMA) functions; hardware or software implemented counters, pointers and/or timers; and/or the like.

In the above exemplary embodiments, a number of software modules were described. As those skilled in the art will appreciate, the software modules may be provided in compiled or un-compiled form and may be supplied to the UE, the base station, and the core network node as a signal over a computer network, or on a recording medium. Further, the functionality performed by part or all of this software may be performed using one or more dedicated hardware circuits. However, the use of software modules is preferred as it facilitates the updating of the UE, the base station, and the core network node in order to update their functionalities.

The above exemplary embodiments are also applicable to 'non-mobile' or generally stationary user equipment.

The sending, by the base station apparatus, said information identifying an integrity protected data rate may comprise sending at least one of a 'UE Context Setup Request' message and a 'UE Context Modification Request' message. The information identifying said integrity protected data rate may comprise an information element identifying a bit rate at DRB level for uplink integrity protected data transmissions (e.g. an 'UL DRB Integrity Protected Data Rate' information element).

The method performed by the base station apparatus may further comprise performing, by said at least one DU, admission control at DRB level based on said information identifying said integrity protected data rate.

The notifying, by the base station apparatus, may comprise transmitting to the UE, as part of a Secondary Node addition procedure or a Secondary Node modification procedure, a message comprising information identifying said portion, allocated to the SN, of the total uplink maximum integrity protected data rate for the UE. Alternatively, the notifying may comprise sending an 'RRCConnectionReconfiguration' message to the UE, the message comprising at least one information element identifying said portion, allocated to the SN, of the total uplink maximum integrity protected data rate for the UE.

The notifying, by the base station apparatus, may comprise sending an information element (e.g. a 'secondaryCellGroupPortionPercentage' information element) indicating an uplink maximum integrity protected data rate portion allocated for the UE at the SN (for all Data Radio Bearers (DRBs) of the UE).

The notifying may comprise sending an information element (e.g. a 'maximumBitRate' information element) indicating an uplink maximum integrity protected data rate allocated for the UE for a given Data Radio Bearer (DRB).

The base station apparatus may be configured as a master node (MN).

The method performed by the UE may comprise transmitting integrity protected data on a plurality of DRBs, and sending said MAC CE when a data rate for at least one of said plurality of DRBs changes.

Various other modifications will be apparent to those skilled in the art and will not be described in further detail here.

Annex

The following is a detailed description of the UE context setup and UE context modification procedures in the currently proposed 3GPP standard (3GPP TS 38.473 V 15.4.1). Whilst various features are described as being essential or necessary, this may only be the case for the proposed 3GPP standard, for example due to other requirements imposed by the standard. These statements should not, therefore, be construed as limiting the present invention in any way.

UE Context Setup

Figure 11:
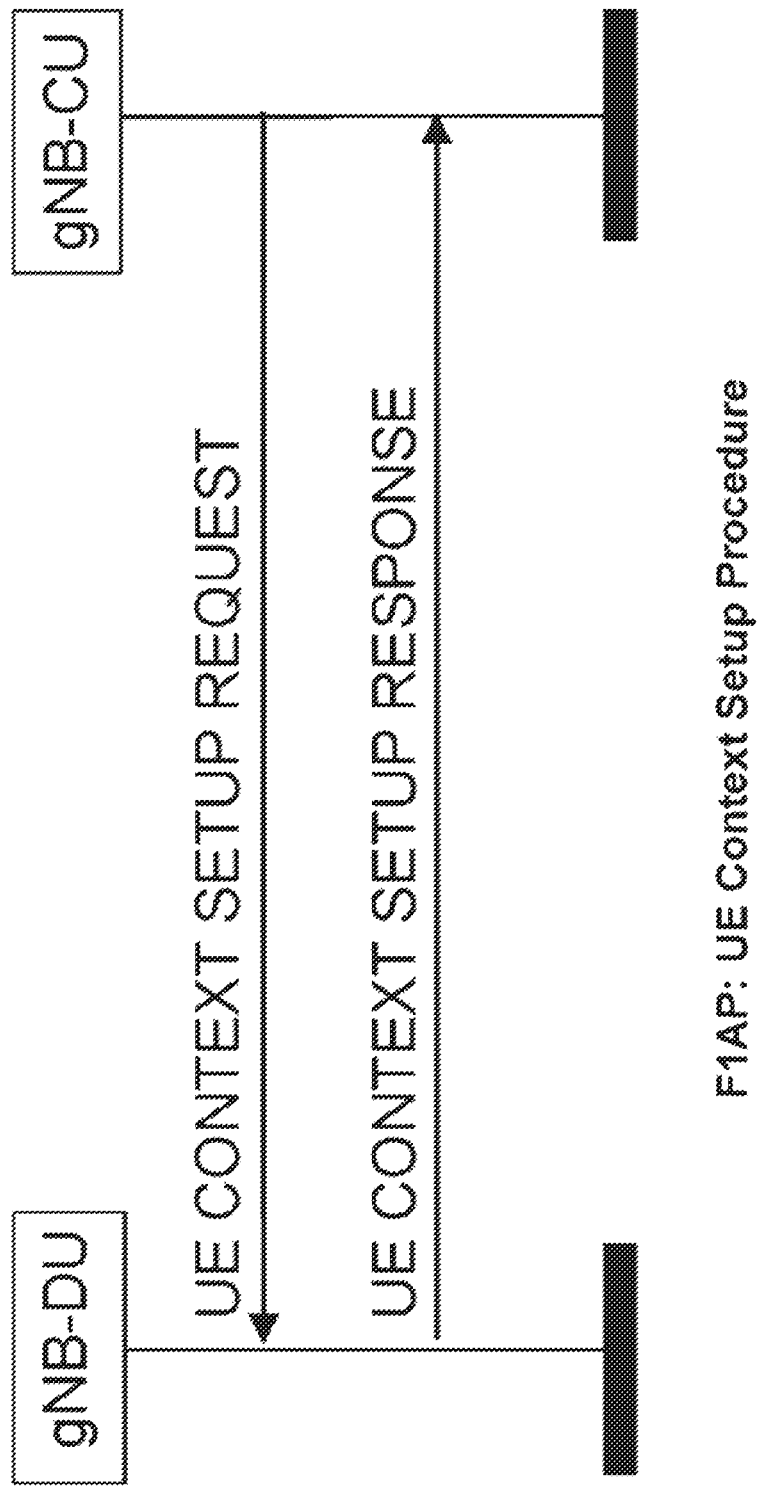
FIG. 11 is a schematic overview of the F1AP UE Context Setup procedure.

FIG. 11 is a schematic overview of the F1AP UE Context Setup procedure.

The purpose of the UE Context Setup procedure is to establish the UE Context including, among others, SRB, and DRB configuration. The procedure uses UE-associated signalling.

The gNB-CU initiates the procedure by sending UE CONTEXT SETUP REQUEST message to the gNB-DU. If the gNB-DU succeeds to establish the UE context, it replies to the gNB-CU with UE CONTEXT SETUP RESPONSE. If no UE-associated logical F1-connection exists, the UE-associated logical F1-connection shall be established as part of the procedure.

If the servingCellMO IE is included in the UE CONTEXT SETUP REQUEST message, the gNB-DU shall configure servingCellMO for the indicated SpCell accordingly.

If the SpCell UL Configured IE is included in the UE CONTEXT SETUP REQUEST message, the gNB-DU shall configure UL for the indicated SpCell accordingly.

If the SCell To Be Setup List IE is included in the UE CONTEXT SETUP REQUEST message, the gNB-DU shall act as specified in 3GPP TS 38.401. If the SCell UL Configured IE is included in the UE CONTEXT SETUP REQUEST message, the gNB-DU shall configure UL for the indicated SCell accordingly. If the servingCellMO IE is included in the UE CONTEXT SETUP REQUEST message, the gNB-DU shall configure servingCellMO for the indicated SCell accordingly.

If the DRX Cycle IE is contained in the UE CONTEXT SETUP REQUEST message, the gNB-DU shall use the provided value from the gNB-CU.

If the UL Configuration IE in DRB to Be Setup Item IE is contained in the UE CONTEXT SETUP REQUEST message, the gNB-DU shall take it into account for UL scheduling.

If the SRB To Be Setup List IE is contained in the UE CONTEXT SETUP REQUEST message, the gNB-DU shall act as specified in 3GPP TS 38.401. If Duplication Indication IE is contained in the SRB To Be Setup List IE, the gNB-DU shall, if supported, setup two RLC entities for the indicated SRB.

If the DRB To Be Setup List IE is contained in the UE CONTEXT SETUP REQUEST message, the gNB-DU shall act as specified in 3GPP TS 38.401. If the QoS Flow Mapping Indication IE is included in the DRB To Be Setup List IE for a QoS flow, the gNB-DU may take it into account that only the uplink or downlink QoS flow is mapped to the indicated DRB.

If two UL UP TNL Information IEs are included in UE CONTEXT SETUP REQUEST message for a DRB, gNB-DU shall include two DL UP TNL Information IEs in UE CONTEXT SETUP RESPONSE message and setup two RLC entities for the indicated DRB. gNB-CU and gNB-DU use the UL UP TNL Information IEs and DL UP TNL Information IEs to support packet duplication for intra-gNB-DU CA as defined in 3GPP TS 38.470.

If Duplication Activation IE is included in the UE CONTEXT SETUP REQUEST message for a DRB, gNB-DU should take it into account when activating/deactivating CA based PDCP duplication for the DRB.

If DC Based Duplication Configured IE is included in the UE CONTEXT SETUP REQUEST message for a DRB, gNB-DU shall regard that DC based PDCP duplication is configured for this DRB if the value is set to be "true" and it should take the responsibility of PDCP duplication activation/deactivation. If DC Based Duplication Activation IE is included in the UE CONTEXT SETUP REQUEST message for a DRB, gNB-DU should take it into account when activating/deactivating DC based PDCP duplication for this DRB.

If UL PDCP SN length IE is included in the UE CONTEXT SETUP REQUEST message for a DRB, gNB-DU shall, if supported, store this information and use it for lower layer configuration.

For EN-DC operation, and if the Subscriber Profile ID for RAT/Frequency priority IE is received from an MeNB, the UE CONTEXT SETUP REQUEST message shall contain the Subscriber Profile ID for RAT/Frequency priority IE. The gNB-DU shall store the received Subscriber Profile ID for RAT/Frequency priority in the UE context and use it as defined in 3GPP TS 36.300.

If the Index to RAT/Frequency Selection Priority IE is available at the gNB-CU, the Index to RAT/Frequency Selection Priority IE shall be included in the UE CONTEXT SETUP REQUEST. The gNB-DU may use it for RRM purposes.

The gNB-DU shall report to the gNB-CU, in the UE CONTEXT SETUP RESPONSE message, the result for all the requested DRBs and SRBs in the following way:
  A list of DRBs which are successfully established shall be included in the DRB Setup List IE;
  A list of DRBs which failed to be established shall be included in the DRB Failed to Setup List IE;
  A list of SRBs which failed to be established shall be included in the SRB Failed to Setup List IE.

When the gNB-DU reports the unsuccessful establishment of a DRB or SRB, the cause value should be precise enough to enable the gNB-CU to know the reason for the unsuccessful establishment.

For EN-DC operation, the gNB-CU shall include in the UE CONTEXT SETUP REQUEST the E-UTRAN QoS IE. The allocation of resources according to the values of the Allocation and Retention Priority IE included in the E-UTRAN QoS IE shall follow the principles described for the E-RAB Setup procedure in 3GPP TS 36.413.

For NG-RAN operation, the gNB-CU shall include in the UE CONTEXT SETUP REQUEST the DRB Information IE.

For DC operation, the CG-ConfigInfo IE shall be included in the CU to DU RRC Information IE.

For EN-DC operation, if the gNB-CU includes the SMTC information of the measured frequency(ies) in the MeasurementTimingConfiguration IE of the CU to DU RRC Information IE that is included in the UE CONTEXT SETUP REQUEST message, the gNB-DU shall generate the measurement gaps based on the received SMTC information. Then the gNB-DU shall send the measurement gaps information to the gNB-CU in the MeasGapConfig IE of the DU to CU RRC Information IE that is included in the UE CONTEXT SETUP RESPONSE message.

For EN-DC operation, if the gNB-CU includes the Resource Coordination Transfer Information IE in the UE CONTEXT SETUP REQUEST message, the gNB-DU shall, if supported, use it for the purpose of resource coordination. If the gNB-CU received the MeNB Resource Coordination Information as defined in 3GPP TS 36.423, it shall transparently transfer it to the gNB-DU via the Resource Coordination Transfer Container IE in the UE CONTEXT SETUP REQUEST message. The gNB-DU shall use the information received in the Resource Coordination Transfer Container IE for reception of MeNB Resource Coordination Information at the gNB acting as secondary node as described in 3GPP TS 36.423. If the Resource Coordination E-UTRA Cell Information IE is included in the Resource Coordination Information IE, the gNB-DU shall store the information replacing previously received information for the same E-UTRA cell, and use the stored information for the purpose of resource coordination.

If the Resource Coordination Transfer Container IE is included in the UE CONTEXT SETUP RESPONSE, the gNB-CU shall transparently transfer this information for the purpose of resource coordination as described in 3GPP TS 36.423.

If the Masked IMEISV IE is contained in the UE CONTEXT SETUP REQUEST message the gNB-DU shall, if supported, use it to determine the characteristics of the UE for subsequent handling.

If the SCell Failed To Setup List IE is contained in the UE CONTEXT SETUP RESPONSE message, the gNB-CU shall regard the corresponding SCell(s) failed to be established with an appropriate cause value for each SCell failed to setup.

If the Inactivity Monitoring Request IE is contained in the UE CONTEXT SETUP REQUEST message, gNB-DU may consider that the gNB-CU has requested the gNB-DU to perform UE inactivity monitoring. If the Inactivity Monitoring Response IE is contained in the UE CONTEXT SETUP RESPONSE message and set to "Not-supported", the gNB-CU shall consider that the gNB-DU does not support UE inactivity monitoring for the UE.

If the Full Configuration IE is contained in the UE CONTEXT SETUP RESPONSE message, the gNB-CU shall consider that the gNB-DU has generated the CellGroupConfig IE using full configuration.

If the C-RNTI IE is included in the UE CONTEXT SETUP RESPONSE, the gNB-CU shall consider that the C-RNTI has been allocated by the gNB-DU for this UE context. The UE Context Setup Procedure is not used to configure SRB0.

If the UE CONTEXT SETUP REQUEST message contains the RRC-Container IE, the gNB-DU shall send the corresponding RRC message to the UE via SRB1.

If the Notification Control IE is included in the DRB to Be Setup List IE and it is set to active, the gNB-DU shall, if supported, monitor the QoS of the DRB and notify the gNB-CU if the QoS cannot be fulfilled any longer or if the QoS can be fulfilled again. The Notification Control IE can only be applied to GBR bearers.

If the UL PDU Session Aggregate Maximum Bit Rate IE is included in the QoS Flow Level QoS Parameters IE contained in the UE CONTEXT SETUP REQUEST message, the gNB-DU shall store the received UL PDU Session Aggregate Maximum Bit Rate and use it when enforcing uplink traffic policing for non-GBR Bearers for the concerned UE as specified in 3GPP TS 23.501.

The gNB-CU shall include the gNB-DU UE Aggregate Maximum Bit Rate Uplink IE in the UE CONTEXT SETUP REQUEST message. The gNB-DU shall use the received gNB-DU UE Aggregate Maximum Bit Rate Uplink for non-GBR Bearers for the concerned UE.

UE Context Modification (gNB-CU Initiated)

Figure 12:
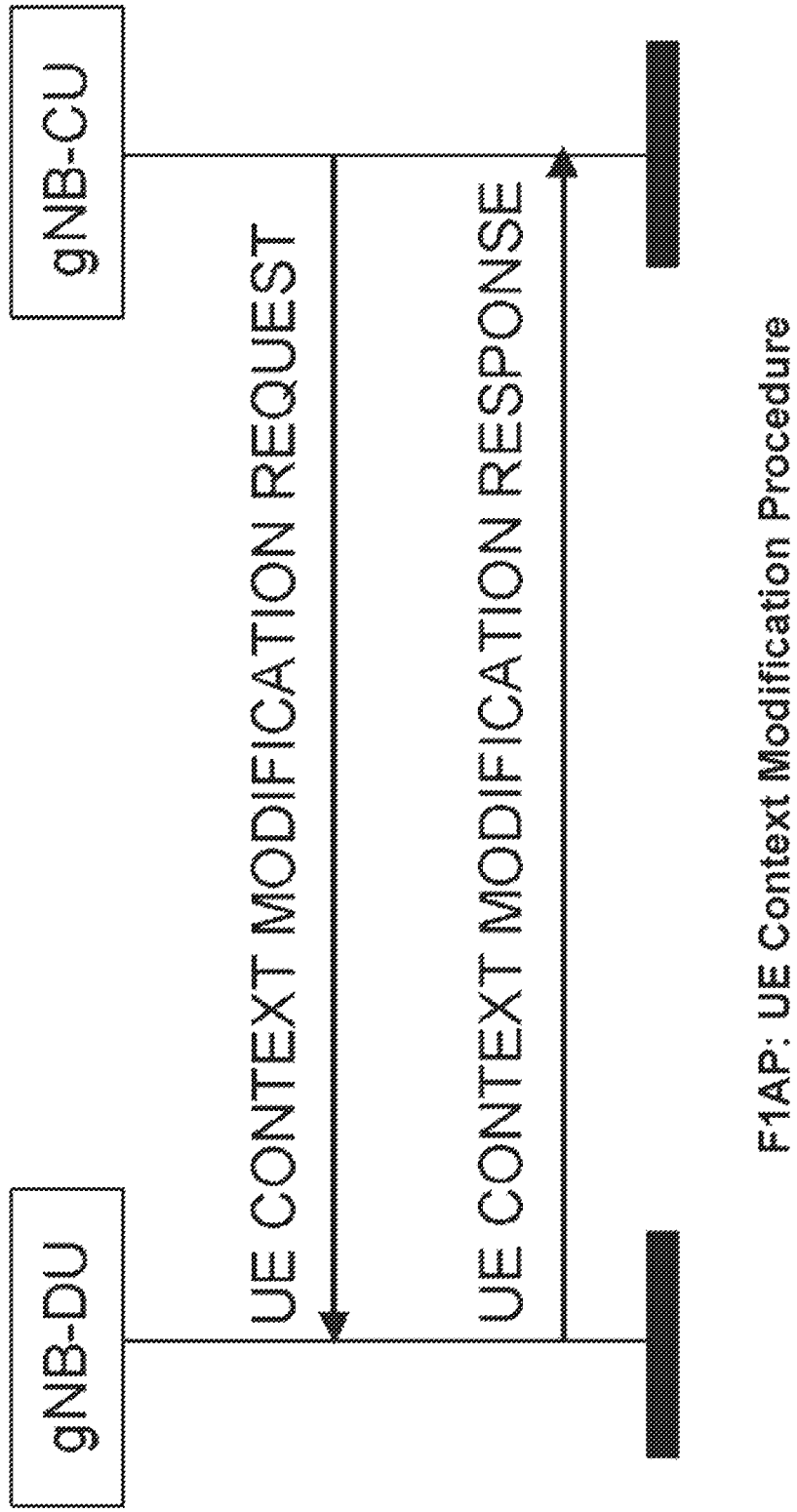
FIG. 12 is a schematic overview of the F1AP UE Context Modification procedure.

FIG. 12 is a schematic overview of the F1AP UE Context Modification procedure.

The purpose of the UE Context Modification procedure is to modify the established UE Context, e.g., establishing, modifying and releasing radio resources. This procedure is also used to command the gNB-DU to stop data transmission for the UE for mobility (see 3GPP TS 38.401). The procedure uses UE-associated signalling.

The F1AP UE CONTEXT MODIFICATION REQUEST message is initiated by the gNB-CU.

Upon reception of the UE Context Modification Request message, the gNB-DU shall perform the modifications, and if successful reports the update in the UE CONTEXT MODIFICATION RESPONSE message.

If the SpCell ID IE is included in the UE CONTEXT MODIFICATION REQUEST message, the gNB-DU shall replace any previously received value and regard it as a reconfiguration with sync as defined in 3GPP TS 38.331. If the ServCellIndex IE is included in the UE CONTEXT MODIFICATION REQUEST message, the gNB-DU shall take this into account for the indicated SpCell. If the SpCell UL Configured IE is included in the UE CONTEXT MODIFICATION REQUEST message, the gNB-DU shall configure UL for the indicated SpCell accordingly. If the servingCellMO IE is included in the UE CONTEXT SETUP REQUEST message, the gNB-DU shall configure servingCellMO for the indicated SpCell accordingly.

If the SCell To Be Setup List IE or SCell To Be Removed List IE is included in the UE CONTEXT MODIFICATION REQUEST message, the gNB-DU shall act as specified in 3GPP TS 38.401. If the SCell To Be Setup List IE is included in the UE CONTEXT MODIFICATION REQUEST message and the indicated SCell(s) are already setup, the gNB-DU shall replace any previously received value. If the SCell UL Configured IE is included in the UE CONTEXT MODIFICATION REQUEST message, the gNB-DU shall configure UL for the indicated SCell accordingly. If the servingCellMO IE is included in the UE CONTEXT SETUP REQUEST message, the gNB-DU shall configure serving-CellMO for the indicated SCell accordingly.

If the DRX Cycle IE is contained in the UE CONTEXT MODIFICATION REQUEST message, the gNB-DU shall use the provided value from the gNB-CU. If the DRX configuration indicator IE is contained in the UE CONTEXT MODIFICATION REQUEST message and set to "release", the gNB-DU shall release DRX configuration.

If the SRB To Be Setup List IE is contained in the UE CONTEXT MODIFICATION REQUEST message, the gNB-DU shall act as specified in 3GPP TS 38.401, and replace any previously received value. If Duplication Indication IE is contained in the SRB To Be Setup List IE, the gNB-DU shall, if supported, setup two RLC entities for the indicated SRB.

If the DRB To Be Setup List IE is contained in the UE CONTEXT MODIFICATION REQUEST message, the gNB-DU shall act as specified in 3GPP TS 38.401.

If two UL UP TNL Information IEs are included in UE CONTEXT MODIFICATION REQUEST message for a DRB, the gNB-DU shall include two DL UP TNL Information IEs in UE CONTEXT MODIFICATION RESPONSE message and setup two RLC entities for the indicated DRB. gNB-CU and gNB-DU use the UL UP TNL Information IEs and DL UP TNL Information IEs to support packet duplication for intra-gNB-DU CA as defined in 3GPP TS 38.470.

If Duplication Activation IE is included in the UE CONTEXT MODIFICATION REQUEST message for a DRB, the gNB-DU should take it into account when activating/deactivating CA based PDCP duplication for the DRB.

If DC Based Duplication Configured IE is included in the UE CONTEXT MODIFICATION REQUEST message for a DRB, the gNB-DU shall regard that DC based PDCP duplication is configured for this DRB if the value is set to be "true" and it should take the responsibility of PDCP duplication activation/deactivation. Otherwise, the gNB-DU shall regard that DC based PDCP duplication is de-configured for this DRB id if the value is set to be "false", and it should stop PDCP duplication activation/deactivation by MAC CE. If DC Based Duplication Activation IE is included in the UE CONTEXT MODIFICATION REQUEST message for a DRB, the gNB-DU should take it into account when activating/deactivating DC based PDCP duplication for this DRB.

If the UL Configuration IE in DRB to Be Setup Item IE or DRB to Be Modified Item IE is contained in the UE CONTEXT MODIFICATION REQUEST message, the gNB-DU shall take it into account for UL scheduling. The gNB-CU may include the RRC Reconfiguration Complete Indicator IE in the UE CONTEXT MODIFICATION REQUEST message to inform the gNB-DU that the ongoing reconfiguration procedure has been successfully performed by the UE. The gNB-DU does not need to wait for this confirmation for using the new UE configuration or taking other actions towards the UE. It is up to gNB-DU implementation when to use the new UE configuration configured.

If UL PDCP SN length IE is included in the UE CONTEXT SETUP MODIFICATION message for a DRB, gNB-DU shall, if supported, store this information and use it for lower layer configuration.

If the RLC Failure Indication IE is included in UE CONTEXT MODIFICATION REQUEST message, the gNB-DU should consider that the RLC entity indicated by such IE needs to be re-established when the CA-based packet duplication is active, and the gNB-DU may include the Associated SCell List IE in UE CONTEXT MODIFICATION RESPONSE by containing a list of SCell(s) associated with the RLC entity indicated by the RLC Failure Indication IE.

If the UE CONTEXT MODIFICATION REQUEST message contains the RRC-Container IE, the gNB-DU shall send the corresponding RRC message to the UE via SRB1. If the UE CONTEXT MODIFICATION REQUEST message includes the Execute Duplication IE, the gNB-DU shall perform CA based duplication, if configured, for the SRB for the included RRC-Container IE.

If the UE CONTEXT MODIFICATION REQUEST message contains the Transmission Stop Indicator IE, the gNB-DU shall stop or restart (if already stopped) data transmission for the UE, according to the value of this IE. It is up to gNB-DU implementation when to stop or restart the UE scheduling.

For EN-DC operation, if the DRB to Be Setup List IE is present in the UE CONTEXT MODIFICATION REQUEST message the gNB-CU shall include the E-UTRAN QoS IE. The allocation of resources according to the values of the Allocation and Retention Priority IE included in the E-UTRAN QoS IE shall follow the principles described for the E-RAB Setup procedure in 3GPP TS 36.413. For NG-RAN operation, the gNB-CU shall include the DRB Information IE in the UE CONTEXT MODIFICATION REQUEST message.

For EN-DC operation, if the gNB-CU includes the Resource Coordination Transfer Information IE in the UE CONTEXT MODIFICATION REQUEST message, the gNB-DU shall, if supported, use it for the purpose of resource coordination. If the gNB-CU received the MeNB Resource Coordination Information as defined in 3GPP TS 36.423, after completion of UE Context Setup procedures, the gNB-CU shall transparently transfer it to the gNB-DU via the Resource Coordination Transfer Container IE in the UE CONTEXT MODIFICATION REQUEST message. The gNB-DU shall use the information received in the Resource Coordination Transfer Container IE for reception of MeNB Resource Coordination Information at the gNB acting as secondary node as described in 3GPP TS 36.423. If the Resource Coordination E-UTRA Cell Information IE is included in the Resource Coordination Transfer Information IE, the gNB-DU shall store the information replacing previously received information for the same E-UTRA cell, and use the stored information for the purpose of resource coordination.

For EN-DC operation, and if the Subscriber Profile ID for RAT/Frequency priority IE is received from an MeNB, the UE CONTEXT MODIFICATION REQUEST message shall contain the Subscriber Profile ID for RAT/Frequency priority IE. The gNB-DU shall store the received Subscriber Profile ID for RAT/Frequency priority in the UE context and use it as defined in 3GPP TS 36.300.

If the Index to RAT/Frequency Selection Priority IE is modified at the gNB-CU, the Index to RAT/Frequency Selection Priority IE shall be included in the UE CONTEXT MODIFICATION REQUEST. The gNB-DU may use it for RRM purposes.

If the UE CONTEXT MODIFICATION REQUEST message contains the Uplink TxDirectCurrentList Information IE, the gNB-DU may take that into account when selecting L1 configuration.

The gNB-DU shall report to the gNB-CU, in the UE CONTEXT MODIFICATION RESPONSE message, the result for all the requested or modified DRBs and SRBs in the following way:
- A list of DRBs which are successfully established shall be included in the DRB Setup List IE;
- A list of DRBs which failed to be established shall be included in the DRB Failed to be Setup List IE;
- A list of DRBs which are successfully modified shall be included in the DRB Modified List IE;
- A list of DRBs which failed to be modified shall be included in the DRB Failed to be Modified List IE;
- A list of SRBs which failed to be established shall be included in the SRB Failed to be Setup List IE.

When the gNB-DU reports the unsuccessful establishment of a DRB or SRB, the cause value should be precise enough to enable the gNB-CU to know the reason for the unsuccessful establishment.

If the Resource Coordination Transfer Container IE is included in the UE CONTEXT MODIFICATION RESPONSE, the gNB-CU shall transparently transfer this information for the purpose of resource coordination as described in 3GPP TS 36.423.

If the UE CONTEXT MODIFICATION RESPONSE message contains the DU To CU RRC Information IE, the gNB-CU shall take this into account.

If the SCell Failed To Setup List IE is contained in the UE CONTEXT MODIFICATION RESPONSE message, the gNB-CU shall regard the corresponding SCell(s) failed to be established with an appropriate cause value for each SCell failed to setup.

If the C-RNTI IE is included in the UE CONTEXT MODIFICATION RESPONSE, the gNB-CU shall consider that the C-RNTI has been allocated by the gNB-DU for this UE context.

If the Inactivity Monitoring Request IE is contained in the UE CONTEXT MODIFICATION REQUEST message, gNB-DU may consider that the gNB-CU has requested the gNB-DU to perform UE inactivity monitoring. If the Inactivity Monitoring Response IE is contained in the UE CONTEXT MODIFICATION RESPONSE message and set to "Not-supported", the gNB-CU shall consider that the gNB-DU does not support UE inactivity monitoring for the UE.

The UE Context Modify Procedure is not used to configure SRB0.

If the Notification Control IE is included in the DRB to Be Setup List IE or the DRB to Be Modified List IE and it is set to active, the gNB-DU shall, if supported, monitor the QoS of the DRB and notify the gNB-CU if the QoS cannot be fulfilled any longer or if the QoS can be fulfilled again. The Notification Control IE can only be applied to GBR bearers.

If the UL PDU Session Aggregate Maximum Bit Rate IE is included in the QoS Flow Level QoS Parameters IE contained in the UE CONTEXT MODIFICATION REQUEST message, the gNB-DU shall replace the received UL PDU Session Aggregate Maximum Bit Rate and use it as specified in 3GPP TS 23.501.

If the gNB-DU UE Aggregate Maximum Bit Rate Uplink IE is included in the UE CONTEXT MODIFICATION REQUEST message, the gNB-DU shall:
- replace the previously provided gNB-DU UE Aggregate Maximum Bit Rate Uplink with the new received gNB-DU UE Aggregate Maximum Bit Rate Uplink;
- use the received gNB-DU UE Aggregate Maximum Bit Rate Uplink for non-GBR Bearers for the concerned UE.

If the RLC Status IE is included in the UE CONTEXT MODIFICATION RESPONSE message, the gNB-CU shall assume that RLC has been reestablished at the gNB-DU and may trigger PDCP data recovery.

If the gNB-DU Configuration Query IE is contained in the UE CONTEXT MODIFICATION REQUEST message, gNB-DU shall include the CellGroupConfig IE in the DU To CU RRC Information IE in the UE CONTEXT MODIFICATION RESPONSE message.

If the Bearer Type Change IE is included in DRB to Be Modified List IE in the UE CONTEXT MODIFICATION REQUEST message, the gNB-DU shall either reset the lower layers or generate a new LCID for the affected bearer as specified in 3GPP TS 37.340.

Some of or all the above-described example embodiments can be described as in the following Supplementary Notes, but are not limited to the following.

(Supplementary Note 1)

A method performed by a base station apparatus comprising a central unit (CU), and one or more distributed units (DUs) for handling user-plane transmissions for a user equipment (UE), the method comprising: obtaining, for a Data Radio Bearer (DRB), an integrity protected data rate for a Protocol Data Unit (PDU) session associated with the UE; and sending information identifying said integrity protected data rate, from the CU to at least one DU, when setting up or modifying a user context associated with the UE.

(Supplementary Note 2)

The method according to Supplementary Note 1, wherein said sending said information identifying an integrity protected data rate comprises sending at least one of a 'UE Context Setup Request' message and a 'UE Context Modification Request' message.

(Supplementary Note 3)

The method according to Supplementary Note 1 or 2, wherein said information identifying said integrity protected data rate comprises an information element identifying a bit rate at DRB level for uplink integrity protected data transmissions (e.g. an 'UL DRB Integrity Protected Data Rate' information element).

(Supplementary Note 4)

The method according to any of Supplementary Notes 1 to 3, further comprising performing, by said at least one DU, admission control at DRB level based on said information identifying said integrity protected data rate.

(Supplementary Note 5)

A method performed by a distributed unit (DU) of a distributed base station apparatus handling user-plane transmissions for a user equipment (UE), the method comprising: receiving, from a central unit (CU) when setting up or modifying a user context associated with the UE, information identifying an integrity protected data rate, for a Data Radio Bearer (DRB), for a Protocol Data Unit (PDU) session associated with the UE.

(Supplementary Note 6)

A method performed by a base station apparatus, the method comprising: obtaining information identifying a total integrity protected uplink data rate for a user equipment (UE); allocating a portion of the total integrity protected uplink data rate to a secondary node (SN); and notifying the UE about said portion allocated to the SN.

(Supplementary Note 7)

The method according to Supplementary Note 6, wherein said notifying comprises transmitting to the UE, as part of a Secondary Node addition procedure or a Secondary Node modification procedure, a message comprising information identifying said portion, allocated to the SN, of the total uplink maximum integrity protected data rate for the UE.
(Supplementary Note 8)
The method according to Supplementary Note 6 or 7, wherein said notifying comprises sending an 'RRCConnectionReconfiguration' message to the UE, the message comprising at least one information element identifying said portion, allocated to the SN, of the total uplink maximum integrity protected data rate for the UE.
(Supplementary Note 9)
The method according to any of Supplementary Notes 6 to 8, wherein said notifying comprises sending an information element (e.g. a 'secondaryCellGroupPortionPercentage' information element) indicating an uplink maximum integrity protected data rate portion allocated for the UE at the SN (for all Data Radio Bearers (DRBs) of the UE).
(Supplementary Note 10)
The method according to any of Supplementary Notes 6 to 8, wherein said notifying comprises sending an information element (e.g. a 'maximumBitRate' information element) indicating an uplink maximum integrity protected data rate allocated for the UE for a given Data Radio Bearer (DRB).
(Supplementary Note 11)
The method according to any of Supplementary Notes 6 to 10, wherein the base station apparatus is configured as a master node (MN).
(Supplementary Note 12)
A method performed by a user equipment (UE), the method comprising: receiving, from a base station apparatus, information identifying a portion, allocated to a secondary node (SN), of a total integrity protected uplink data rate for the UE.
(Supplementary Note 13)
A method performed by a user equipment (UE), the method comprising: transmitting integrity protected data on a Data Radio Bearer (DRB); determining, based on a maximum integrity protected uplink data rate for the UE, a recommended maximum bit rate for integrity protected uplink transmissions for the DRB; and sending, to a base station apparatus, a Medium Access Control (MAC) control element (CE) comprising information identifying said recommended maximum bit rate for integrity protected uplink transmissions for the DRB.
(Supplementary Note 14)
The method according to Supplementary Note 13, comprising transmitting integrity protected data on a plurality of DRBs, and sending said MAC CE when a data rate for at least one of said plurality of DRBs changes.
(Supplementary Note 15)
A base station apparatus comprising a central unit (CU), one or more distributed units (DUs) for handling user-plane transmissions for a user equipment (UE), at least one controller and at least one transceiver, the at least one controller being configured to: obtain, for a Data Radio Bearer (DRB), an integrity protected data rate for a Protocol Data Unit (PDU) session associated with the UE; and send information identifying said integrity protected data rate, from the CU to at least one DU, when setting up or modifying a user context associated with the UE.
(Supplementary Note 16)
A distributed unit (DU) of a distributed base station apparatus handling user-plane transmissions for a user equipment (UE), the DU comprising a controller and a transceiver, the controller being configured to: receive, from a central unit (CU) when setting up or modifying a user context associated with the UE, information identifying an integrity protected data rate, for a Data Radio Bearer (DRB), for a Protocol Data Unit (PDU) session associated with the UE.
(Supplementary Note 17)
A base station apparatus comprising a controller and a transceiver, the controller being configured to: obtain information identifying a total integrity protected uplink data rate for a user equipment (UE); allocate a portion of the total integrity protected uplink data rate to a secondary node (SN); and notify the UE about said portion allocated to the SN.
(Supplementary Note 18)
A user equipment (UE) comprising a controller and a transceiver, the controller being configured to: receive, from a base station apparatus, information identifying a portion, allocated to a secondary node (SN), of a total integrity protected uplink data rate for the UE.
(Supplementary Note 19)
A user equipment (UE) comprising a controller and a transceiver, the controller being configured to: transmit integrity protected data on a Data Radio Bearer (DRB); determine, based on a maximum integrity protected uplink data rate for the UE, a recommended maximum bit rate for integrity protected uplink transmissions for the DRB; and send, to a base station apparatus, a Medium Access Control (MAC) control element (CE) comprising information identifying said recommended maximum bit rate for integrity protected uplink transmissions for the DRB.
(Supplementary Note 20)
A computer program product comprising instructions for causing a computer-programmable device to perform a method according to any of Supplementary Notes 1 to 14.

This application is based upon and claims the benefit of priority from United Kingdom Patent Application No. 1904883.4, filed on Apr. 5, 2019, the disclosure of which is incorporated herein in its entirety by reference.

What is claimed is:
1. A method performed by a base station comprising a central unit (CU), and one or more distributed units (DUs) for handling a user-plane transmission for a user equipment (UE), the method comprising:
   obtaining, for a Data Radio Bearer (DRB), an integrity protected data rate for a Protocol Data Unit (PDU) session associated with the UE; and
   sending information identifying the integrity protected data rate, from the CU to at least one DU, when setting up or modifying a user context associated with the UE,
   wherein the information identifying the integrity protected data rate comprises an information element identifying a bit rate at a DRB level for a uplink integrity protected data transmission.
2. The method according to claim 1, wherein the sending the information identifying an integrity protected data rate comprises sending at least one of a 'UE Context Setup Request' message and a 'UE Context Modification Request' message.
3. The method according to claim 1, further comprising performing, by the at least one DU, admission control at a DRB level based on the information identifying the integrity protected data rate.
4. A method performed by a distributed unit (DU) of a distributed base station handling a user-plane transmission for a user equipment (UE), the method comprising:
   receiving, from a central unit (CU) when setting up or modifying a user context associated with the UE, information identifying an integrity protected data rate, for a Data Radio Bearer (DRB), for a Protocol Data Unit (PDU) session associated with the UE, wherein the information identifying the integrity protected data rate comprises an information element identifying a bit rate at a DRB level for a uplink integrity protected data transmission.

5. A base station comprising a central unit (CU), one or more distributed units (DUs) for handling a user-plane transmission for a user equipment (UE), the base station comprising:
   at least one memory storing instructions; and
   at least one processor configured to process the instructions to:
      obtain, for a Data Radio Bearer (DRB), an integrity protected data rate for a Protocol Data Unit (PDU) session associated with the UE; and
      send information identifying the integrity protected data rate, from the CU to at least one DU, when setting up or modifying a user context associated with the UE,
   wherein the information identifying the integrity protected data rate comprises an information element identifying a bit rate at a DRB level for a uplink integrity protected data transmission.

6. A distributed unit (DU) of a distributed base station handling a user-plane transmission for a user equipment (UE), the DU comprising:
   at least one memory storing instructions; and
   at least one processor configured to process the instructions to:
      receive, from a central unit (CU) when setting up or modifying a user context associated with the UE, information identifying an integrity protected data rate, for a Data Radio Bearer (DRB), for a Protocol Data Unit (PDU) session associated with the UE,
   wherein the information identifying the integrity protected data rate comprises an information element identifying a bit rate at a DRB level for a uplink integrity protected data transmission.

* * * * *